(12) United States Patent
Kobayashi et al.

(10) Patent No.: US 10,884,786 B2
(45) Date of Patent: Jan. 5, 2021

(54) SWITCH DEVICE, SWITCHING METHOD, AND COMPUTER PROGRAM PRODUCT

(71) Applicant: KABUSHIKI KAISHA TOSHIBA, Minato-ku (JP)

(72) Inventors: Yuta Kobayashi, Ota (JP); Yasin Oge, Sagamihara (JP); Takahiro Yamaura, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 143 days.

(21) Appl. No.: 16/282,055

(22) Filed: Feb. 21, 2019

(65) Prior Publication Data

US 2020/0089525 A1 Mar. 19, 2020

(30) Foreign Application Priority Data

Sep. 18, 2018 (JP) .................................. 2018-174249

(51) Int. Cl.
*G06F 9/48* (2006.01)
*H04L 12/931* (2013.01)
(Continued)

(52) U.S. Cl.
CPC ........ *G06F 9/4837* (2013.01); *G06F 9/45558* (2013.01); *G06F 9/485* (2013.01);
(Continued)

(58) Field of Classification Search
None
See application file for complete search history.

(56) References Cited

U.S. PATENT DOCUMENTS 5,535,418 A 7/1996 Suzuki

FOREIGN PATENT DOCUMENTS

JP 6-19823 1/1994
JP 2001-216170 8/2001
(Continued)

OTHER PUBLICATIONS

Oliver, et al., "IEEE 802.1Qbv Gate Control List Synthesis Using Array Theory Encoding", Apr. 2018, IEEE Computer Society, pp. 13-24. (Year: 2018).*

(Continued)

*Primary Examiner* — Qing Yuan Wu
(74) *Attorney, Agent, or Firm* — Oblon, McClelland, Maier & Neustadt, L.L.P.

(57) ABSTRACT

According to an embodiment, a switch device includes a memory and one or more hardware processors coupled to the memory. The one or more hardware processors are configured to function as a selection unit and a determination unit. The selection unit, based on task schedule information synchronized with transmission schedule information where transmission timing of first data is determined for each priority of the first data, selects a first task of executing transfer processing of the first data and calculates an end time of transfer processing executed by the selected first task. The determination unit, from the end time and a current time, determines whether transfer processing of the first data is executable. The first task selected by the selection unit, when the transfer processing is executable, executes the transfer processing of the first data based on the transmission schedule information.

10 Claims, 31 Drawing Sheets

(51) Int. Cl.
*H04L 12/46* (2006.01)
*G06F 9/455* (2018.01)

(52) U.S. Cl.
CPC ............ *H04L 49/354* (2013.01); *H04L 49/70* (2013.01); *G06F 2009/45595* (2013.01); *H04L 12/4641* (2013.01)

(56) References Cited

FOREIGN PATENT DOCUMENTS

| | | |
|---|---|---|
| JP | 2006-268092 | 10/2006 |
| JP | 2007-323256 | 12/2007 |

OTHER PUBLICATIONS

Craciunas et al., "Scheduling Real-Time Communication in IEEE 802.1Qbv Time Sensitive Networks", Oct. 2016, ACM, pp. 183-192. (Year: 2016).*
Craciunas et al., "An Overview of Scheduling Mechanisms for Time-sensitive Networks", 2017, pp. 1-7. (Year: 2017).*
Craciunas et al., "Combined task- and network-level scheduling for distributed time-triggered systems", Oct. 2015, Springer, pp. 161-200. (Year: 2015).*

* cited by examiner

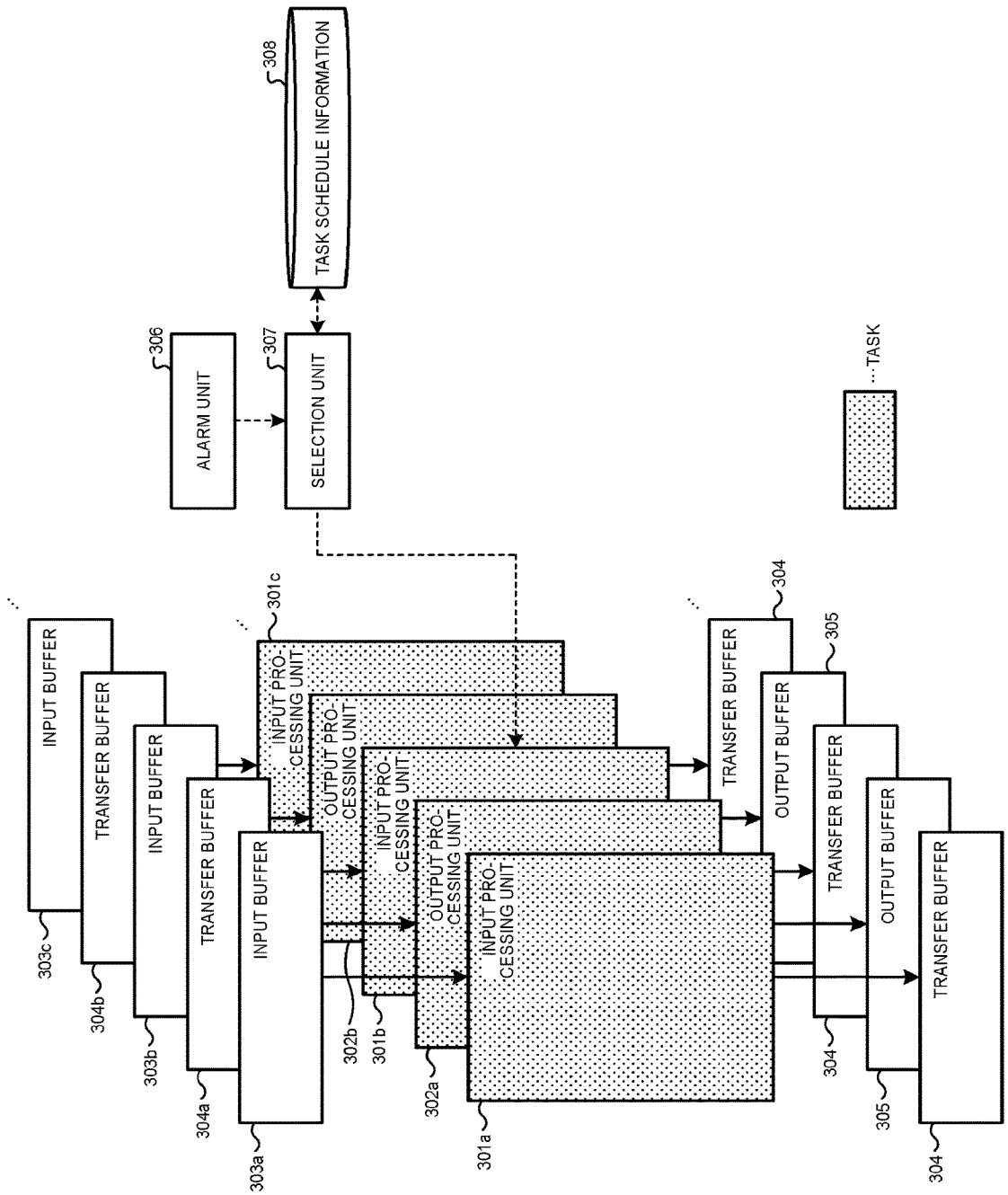

-base_time (GCL): 2018/7/4/10:00.0000.0000
-tick: 1000ns
-next_task (ID): 5

| ID | TASK |
|---|---|
| 1 | br_out (pif) |
| 2 | br_in (pif) |
| 3 | br_out (vif1) |
| 4 | br_in (vif1) |
| 5 | br_out (vif2) |
| 6 | br_in (vif2) |
| 7 | fdb_clean | next_task → 5

-base_time (GCL): 2018/7/4/10:00.0000.0000
-next_task (ID): 5

| ID | TASK | EXECUTION TIME (ns) |
|---|---|---|
| 1 | br_out (pif) | 10000 |
| 2 | br_in (pif) | 8000 |
| 3 | br_out (vif1) | 10000 |
| 4 | br_in (vif1) | 8000 |
| 5 | br_out (vif2) | 20000 |
| 6 | br_in (vif2) | 15000 |
| 7 | fdb_clean | 5000 | next_task → 5

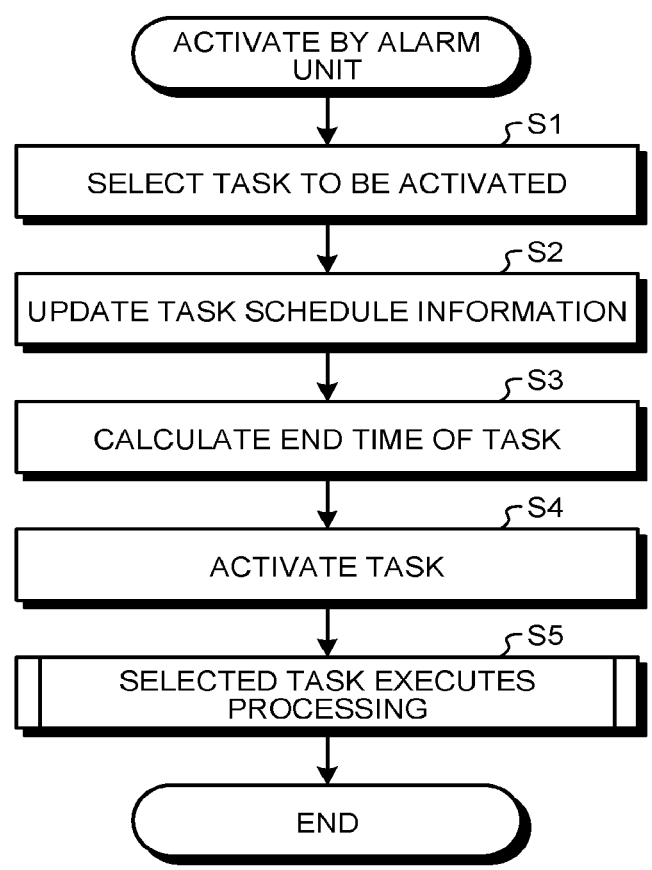

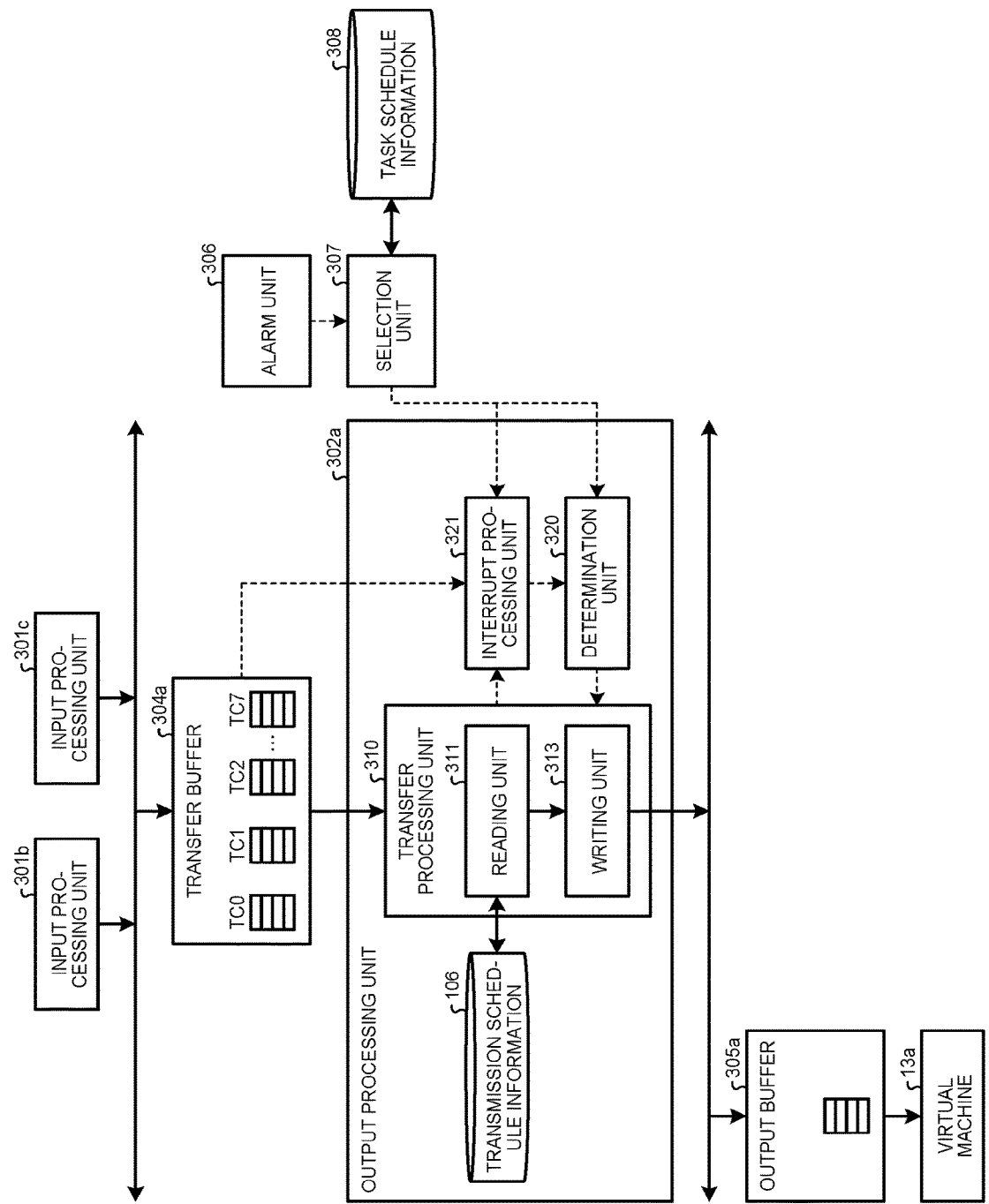

FIG.16A

-base_time (GCL): 2018/7/4/10:00.0000.0000
-tick: 1000ns
-prev_task (ID): 4
-next_task (ID): 5

| ID | TASK |
|---|---|
| 1 | br_out (pif) |
| 2 | br_in (pif) |
| 3 | br_out (vif1) |
| 4 | br_in (vif1) |
| 5 | br_out (vif2) |
| 6 | br_in (vif2) |
| 7 | fdb_clean | prev_task → 4
next_task → 5

FIG.16B

-base_time (GCL): 2018/7/4/10:00.0000.0000
-prev_task (ID): 4
-next_task (ID): 5

| ID | TASK | EXECUTION TIME (ns) |
|---|---|---|
| 1 | br_out (pif) | 10000 |
| 2 | br_in (pif) | 8000 |
| 3 | br_out (vif1) | 10000 |
| 4 | br_in (vif1) | 8000 |
| 5 | br_out (vif2) | 20000 |
| 6 | br_in (vif2) | 15000 |
| 7 | fdb_clean | 5000 | prev_task → 4
next_task → 5

SWITCH DEVICE, SWITCHING METHOD, AND COMPUTER PROGRAM PRODUCT

CROSS-REFERENCE TO RELATED APPLICATIONS

This application is based upon and claims the benefit of priority from Japanese Patent Application No. 2018-174249, filed on Sep. 18, 2018; the entire contents of which are incorporated herein by reference.

FIELD

Embodiments described herein relate generally to a switch device, a switching method, and a computer program product.

BACKGROUND

In fields of industrial networks that connect industrial equipment in a factory, in-vehicle networks that connect controllers in a vehicle, and the like, high real-time performance is required. In recent years, in industrial networks, in-vehicle networks, and the like, use of communication standards such as Ethernet (registered trademark) has been advanced, and various real-time Ethernet standards have been proposed.

BRIEF DESCRIPTION OF THE DRAWINGS

FIG. 6 is a diagram for illustrating an example of controlling a task of the switch device according to the first embodiment;

FIG. 8 is a flowchart for illustrating an example of activation processing of the task according to the first embodiment;

FIG. 15 is a diagram for illustrating an example of a functional configuration of an output processing unit according to the second embodiment;

FIG. 16A is a diagram for illustrating a first example of task schedule information according to the second embodiment;

FIG. 16B is a diagram for illustrating a second example of the task schedule information according to the second embodiment;

DETAILED DESCRIPTION

Figure 1:
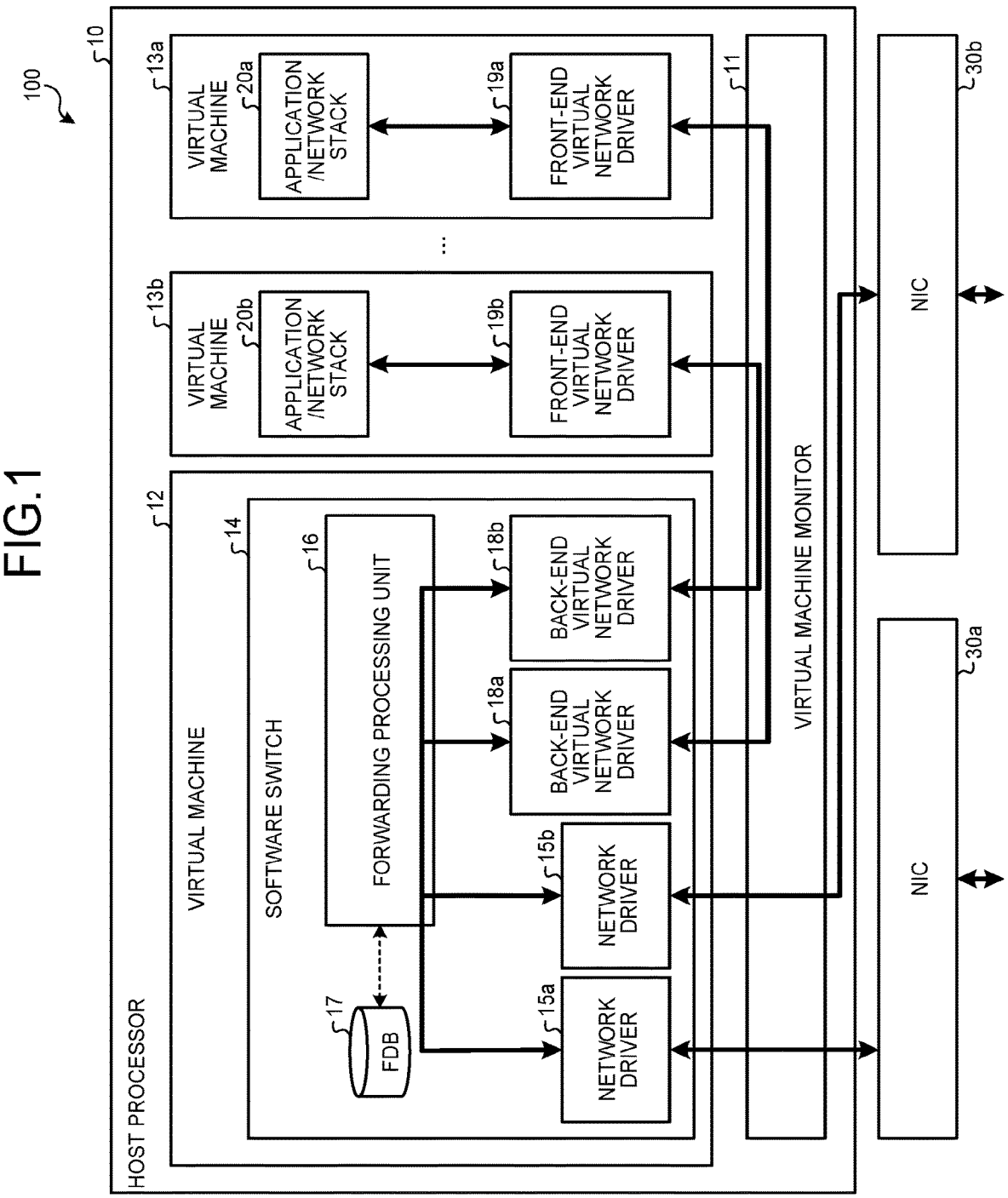
FIG. 1 is a schematic diagram for illustrating an example of a switch device that transfers data among virtual machines.

According to an embodiment, a switch device includes a memory and one or more hardware processors coupled to the memory. The one or more hardware processors are configured to function as a selection unit and a determination unit. The selection unit, based on task schedule information synchronized with transmission schedule information where transmission timing of first data is determined for each priority of the first data, selects a first task of executing transfer processing of the first data and calculates an end time of transfer processing executed by the selected first task. The determination unit, from the end time and a current time, determines whether transfer processing of the first data is executable. The first task selected by the selection unit, when the transfer processing is executable, executes the transfer processing of the first data based on the transmission schedule information.

Embodiments of a switch device, a switching method, and a program will be described below in detail with reference to the accompanying drawings.

First Embodiment

First, examples of standards used in fields such as industrial networks and in-vehicle networks that require high real-time performance will be described.

For example, as a standard that realizes real-time performance on Ethernet (registered trademark), standardization of Time-Sensitive Networking (TSN) is advanced with IEEE 802.1 TSN Task. TSN is composed of a plurality of standards. TSN is an extended standard of audio/video bridging (AVB) that realizes low delay property used in professional audio, for example. TSN is a standard aiming to realize high reliability in addition to higher real-time performance than AVB in order to be applicable to industrial networks, in-vehicle networks, and the like.

One of the TSN standards is IEEE 802.1 Qbv. IEEE 802.1 Qbv controls a plurality of transmission buffers (transmission queues in IEEE 802.1 Qbv) with different priorities in accordance with pre-set transmission schedule information (gate control list), which makes it possible to strictly control transmission timing of data (frame) for each priority. Each transmission buffer is provided with a gate that permits data transmission. When a gate is open (open state), data transmission is permitted, and when a gate is closed (closed state), data transmission is prohibited.

States of each gate for one cycle are stored in the gate control list. For example, a network interface card (NIC) compliant with IEEE 802.1 Qbv selects, based on a current time, a gate control list, a start time (reference time) of gate control, and the like, a queue with a priority permitted to be transmitted and executes data (frame) transmission processing. Thus, by strictly controlling data transmission timing in accordance with a gate control list, it is possible to prevent a collision of transmission timings among data with different priorities and to further reduce, for example, fluctuations in transmission delay time and transmission processing time.

Next, an example when software technology such as virtualization technology is applied to an industrial system, an in-vehicle system, and the like will be described. For example, it is conceivable to realize a switch (virtual switch) that connects virtual machines with software.

FIG. 1 is a schematic diagram for illustrating an example of a switch device 100 that transfers data between virtual machines 13a and 13b. The example in FIG. 1 illustrates a case where a switch function is realized by a virtual machine 12 that operates on a host processor 10.

The switch device 100 includes the host processor 10 and NICs 30a and 30b. The host processor 10 includes a virtual machine monitor 11, virtual machines 12, 13a, and 13b.

The host processor 10 is a device that controls the switch device 100.

The NICs 30a and 30b are physical interfaces of the switch device 100.

The virtual machine monitor 11 controls the virtual machines 12, 13a, and 13b. The virtual machines 12, 13a, and 13b operate on the virtual machine monitor 11.

The virtual machine 12 includes a software switch 14. The software switch 14 includes a network driver 15a, a network driver 15b, a forwarding processing unit 16, a forwarding/filtering database (FDB) 17, and back-end virtual network drivers 18a and 18b.

The network driver 15a controls communication between the NIC 30a and the forwarding processing unit 16. Similarly, the network driver 15b controls communication between the NIC 30b and the forwarding processing unit 16.

The forwarding processing unit 16 refers to the FDB 17 and controls transfer of data (frame).

The back-end virtual network driver 18a controls communication with the virtual machine 13a. Likewise, the back-end virtual network driver 18b controls communication with the virtual machine 13b.

The virtual machine 13a includes a front-end virtual network driver 19a and an application/network stack 20a. The front-end virtual network driver 19a controls communication between the application/network stack 20a and the software switch 14.

Similarly, the virtual machine 13b includes a front-end virtual network driver 19b and an application/network stack 20b. The front-end virtual network driver 19b controls communication between the application/network stack 20b and the software switch 14.

Next, as illustrated in FIG. 1, a problem when a switch (virtual switch) that connects the virtual machines 13a and 13b is realized with software (the software switch 14) will be described. For example, in software, unlike hardware, there is a problem that the number of tasks to be executed simultaneously is limited.

Generally, hardware is designed to simultaneously execute transfer processings by the number of devices (number of network ports) connected to a switch. On the other hand, in software, processings can be simultaneously executed by the number of CPUs to be executed. In normal software, tasks and threads are executed in parallel, but this merely uses CPU resources in a time-sharing manner using functions such as OS.

There is no problem as long as it is a general software switch that does not require real-time performance, but in a switch requiring real-time performance, fluctuations in processing time hard to estimate due to OS task scheduling, a context switch, and the like are a big problem. Therefore, when real-time communication is realized by a software switch, it is necessary to execute each task of a software switch in synchronization with transmission (transfer) timing of a frame scheduled in advance.

It is also necessary to consider methods of starting transfer of a frame stored in a queue. In general, there are two methods for transferring a frame stored in a queue: a method using an interrupt and a method using polling. In the former, since processing is executed when a frame exists in a queue, a CPU use efficiency is good, but overhead of interrupt processing occurs. In the latter, since a queue is always monitored to execute frame transfer, high-speed frame transfer can be realized, but even when no frame exists in a queue, CPU resources are consumed.

As hybrid processing of transfer by an interrupt and transfer by polling, there is a method called new API (NAPI) used in Linux (registered trademark). The NAPI operates by polling while a frame exists in a queue, and shifts to a state waiting for an interrupt when a queue becomes empty. Consequently, while high-speed frame transfer is realized by polling, when no frame exists in a queue, CPU resources can be allocated to another processing (task).

However, in a network switch requiring real-time communication, a method for starting transfer processing with an interrupt as an origin (including the NAPI) makes it difficult to assume at what timing an interrupt occurs and causes processing time hard to estimate. For example, normally, processing related to an interrupt is executed with a highest priority. Therefore, during frame transfer processing of a certain network interface, when an interrupt of another network interface occurs, an unexpected processing delay occurs.

First Premise Description

A switch device described in the first embodiment is a network switch that transmits a frame at timing scheduled in advance such as IEEE 802.1 Qbv. The following description assumes IEEE 802.1 Qbv, but the switch device according to the present embodiment is not limited thereto.

Second Premise Description

Figure 2:
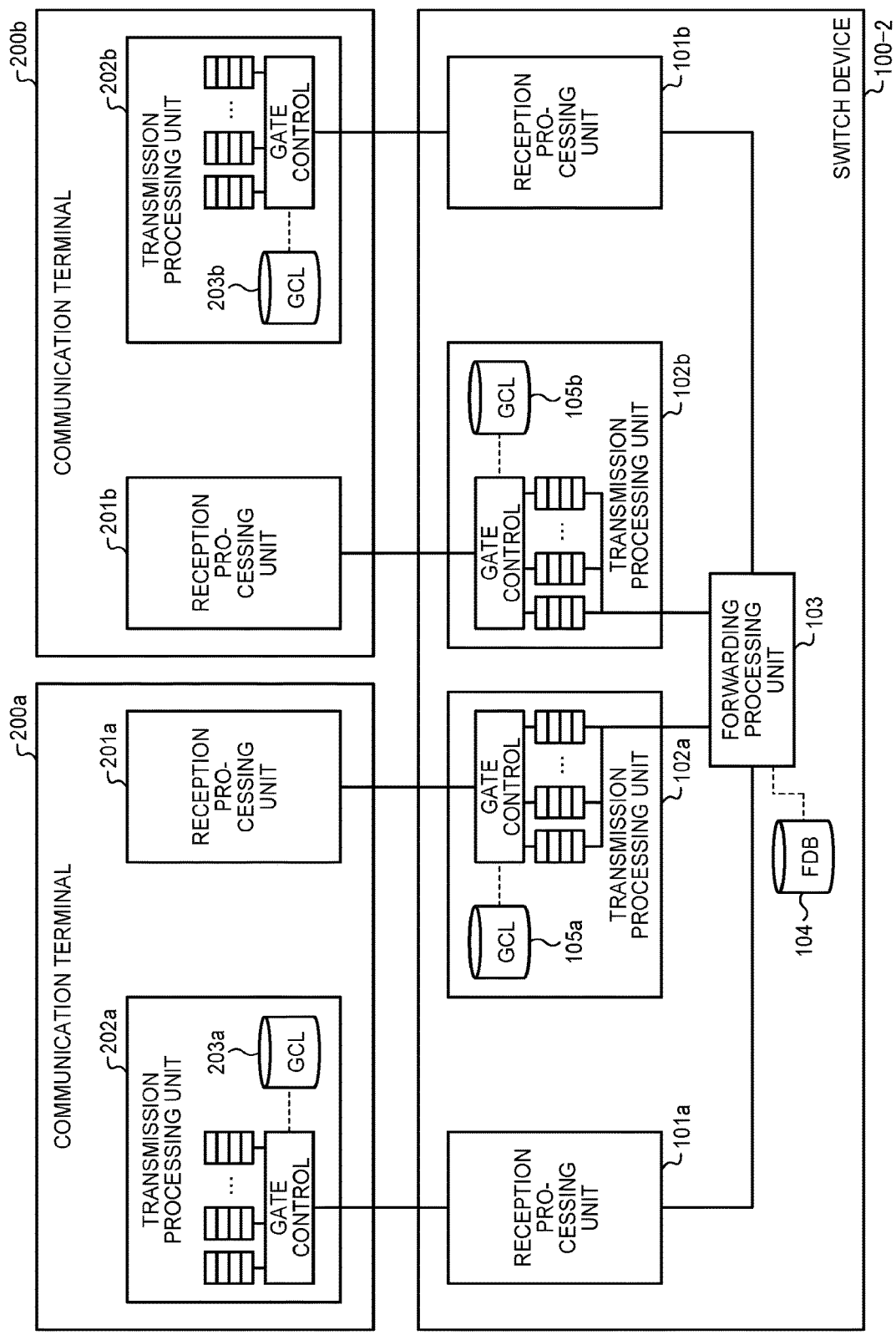
FIG. 2 is a schematic diagram for illustrating an example of a switch device compliant with IEEE 802.1 Qbv and a communication terminal connected to the switch device.

FIG. 2 is a schematic diagram for illustrating an example of a switch device 100-2 compliant with IEEE 802.1 Qbv and communication terminals 200a and 200b connected to the switch device 100-2. The switch device 100-2 is a TSN switch. A switch function of the switch device 100-2 may be realized by hardware or may be realized by software.

The switch device 100-2 includes a reception processing unit 101a, a reception processing unit 101b, a transmission processing unit 102a, a transmission processing unit 102b, a forwarding processing unit 103, an FDB 104, a GCL 105a, and a GCL 105b.

The reception processing unit 101a receives data (frame) from the communication terminal 200a. Similarly, the reception processing unit 101b receives data from the communication terminal 200b.

The transmission processing unit 102a controls, according to the GCL 105a of IEEE 802.1 Qbv, which transmission queue data (frame) is to be transmitted to the communication terminal 200a. Similarly, the transmission processing unit 102b controls, according to the GCL 105b of IEEE 802.1 Qbv, which transmission queue data is to be transmitted to the communication terminal 200b.

Descriptions of the forwarding processing unit 103 and the FDB 104 are similar to those of FIG. 1 and thus will be omitted.

The communication terminal 200a includes a reception processing unit 201a and a transmission processing unit 202a. The reception processing unit 201a receives data from the switch device 100-2. The transmission processing unit 202a controls, according to the GCL 203a of IEEE 802.1 Qbv, which transmission queue data (frame) is to be transmitted to the switch device 100-2.

The communication terminal 200b includes a reception processing unit 201b and a transmission processing unit 202b. Descriptions of the reception processing unit 201b and the transmission processing unit 202b are similar to those of the reception processing unit 201a and the transmission processing unit 202a and thus will be omitted.

Note that a configuration when virtual machines are connected to the switch device 100-2 is similar to one in FIG. 2 described above. However, as with Split Driver Model used in Xen (registered trademark), it is also conceivable to have a configuration as illustrated in FIG. 3 in which I/O processing of a network of each virtual machine is separated and executed on one virtual machine.

Figure 3:
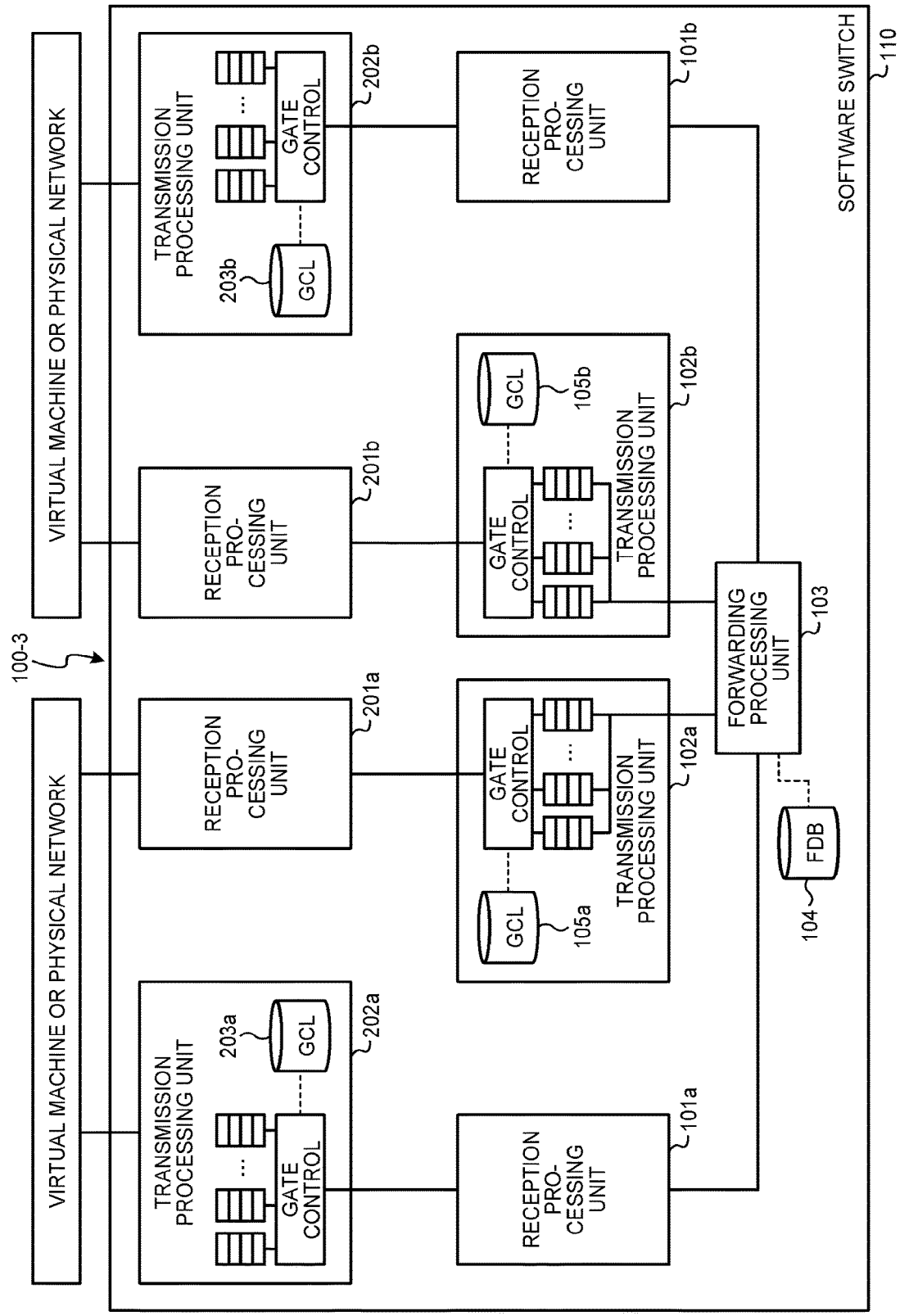
FIG. 3 is a schematic diagram for illustrating an example of a switch device compliant with IEEE 802.1 Qbv when I/O processing of a network is realized by a dedicated virtual machine.

FIG. 3 is a schematic diagram for illustrating an example of a switch device 100-3 compliant with IEEE 802.1 Qbv when I/O processing of a network is realized by a dedicated virtual machine. In the switch device 100-3, a switch function is realized by a software switch (virtual TSN switch) 110 compliant with IEEE 802.1 Qbv.

With a configuration as illustrated in FIG. 3, there is an advantage that the software switch 110 executes processing for real-time communication and other virtual machines do not need to control transmission timing like IEEE 802.1 Qbv. Hereinafter, the embodiment will be described assuming the configuration as illustrated in FIG. 3, but the present embodiment is not limited to the configuration in FIG. 3.

Figure 4:
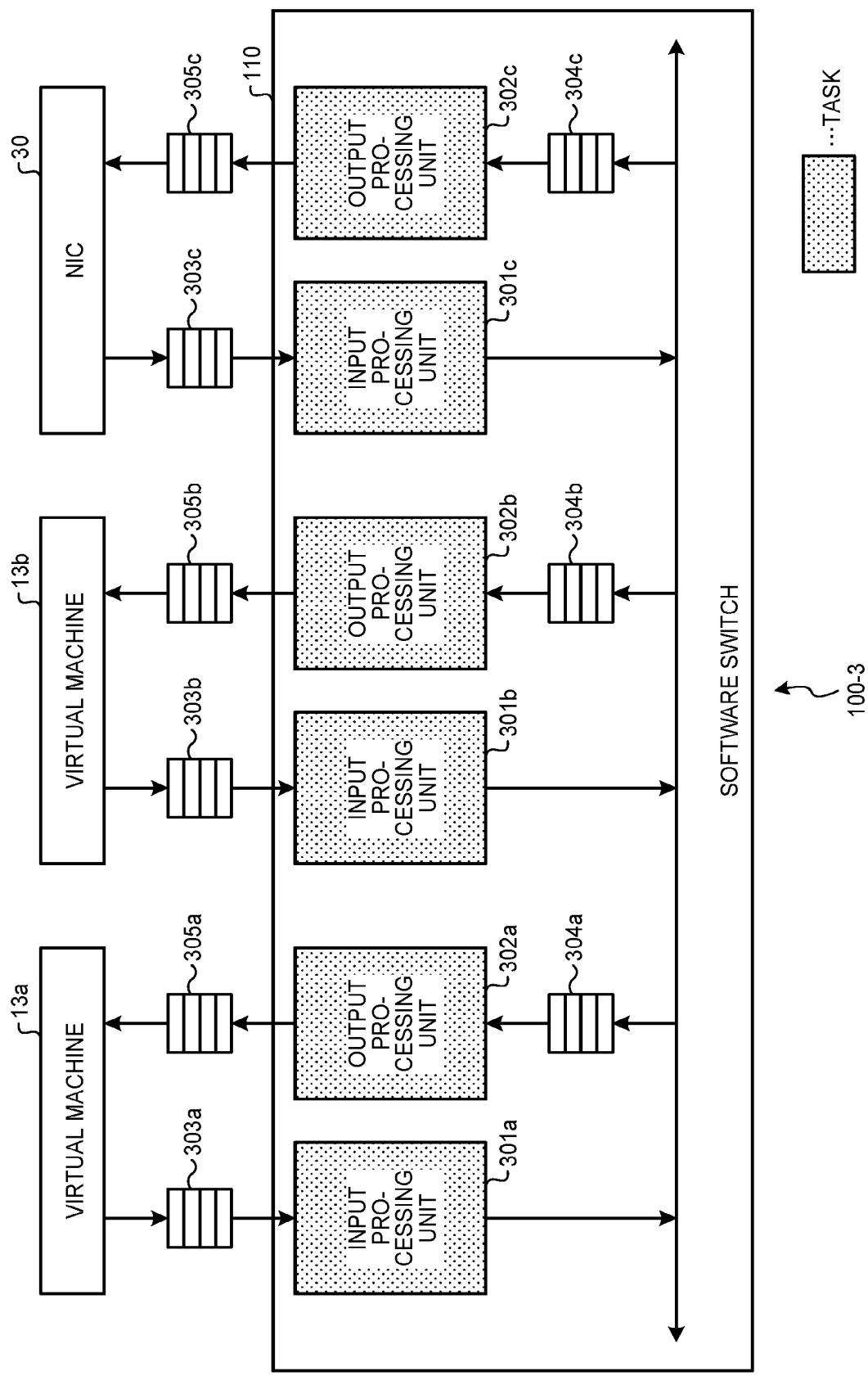
FIG. 4 is a schematic diagram for illustrating an example of input/output processing of a switch device according to a first embodiment.

FIG. 4 is a schematic diagram for illustrating an example of input/output processing of the switch device 100-3 according to the first embodiment. The switch device 100-3 according to the first embodiment is connected to the virtual machine 13a, the virtual machine 13b, and a NIC 30. The switch device 100-3 executes data transfer processing (frame transfer processing) among the virtual machine 13a, the virtual machine 13b, and the NIC 30.

The software switch 110 includes input processing units 301a to 301c, output processing units 302a to 302c, input buffers 303a to 303c, transfer buffers 304a to 304c, and output buffers 305a to 305c for each network port connected to the virtual machine 13a, the virtual machine 13b, and the NIC 30.

When the input processing units 301a to 301c are not distinguished from one another, they are simply referred to as an input processing unit 301. Similarly, when the output processing units 302a to 302c are not distinguished from one another, they are simply referred to as an output processing unit 302. Similarly, when the input buffers 303a to 303c are not distinguished from one another, they are simply referred to as an input buffer 303. Similarly, when the transfer buffers 304a to 304c are not distinguished from one another, they are simply referred to as a transfer buffer 304. Similarly, when the output buffers 305a to 305c are not distinguished from one another, they are simply referred to as an output buffer 305.

The input processing unit 301 in FIG. 4 corresponds to a transmission processing unit 202, a reception processing unit 101 and the forwarding processing unit 103 in FIG. 3. The output processing unit 302 in FIG. 4 corresponds to a transmission processing unit 102 and a reception processing unit 201 in FIG. 3.

When receiving data (frame) from the virtual machine 13a via the input buffer 303a, the input processing unit 301a refers to header information of the data to determine a network port at a transfer destination and writes the data in a corresponding transfer buffer 304. For example, when a destination of data is the virtual machine 13b, the input processing unit 301a writes the data in the transfer buffer 304b.

When acquiring data from the transfer buffer 304a, the output processing unit 302a outputs the data to the virtual machine 13a via the output buffer 305a.

Descriptions of the input processing units 301b and 301c are similar to those of the input processing unit 301a and thus will be omitted. Likewise, descriptions of the output processing units 302b and 302c are similar to those of the output processing unit 302a and thus will be omitted.

The switch device 100-3 according to the first embodiment regards the input processing unit 301 and the output processing unit 302 of each network port as one task and is activated at timing scheduled in advance. This eliminates fluctuations in processing time hard to estimate due to a context switch, or the like.

Figure 5:
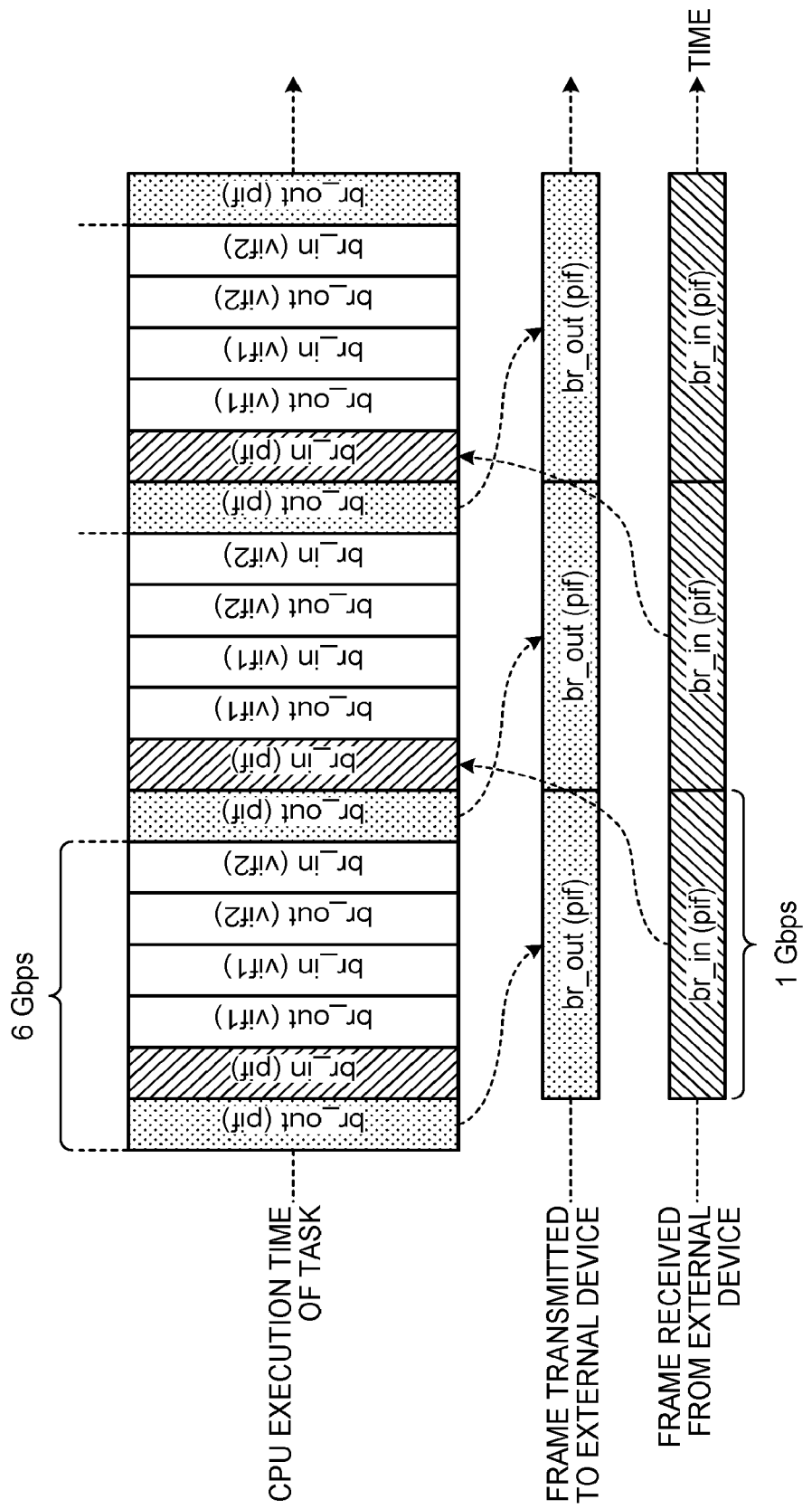
FIG. 5 is a diagram for illustrating an image of executing a task according to the first embodiment.

FIG. 5 is a diagram for illustrating an image of executing a task according to the first embodiment. An example in FIG. 5 illustrates an image of executing the task when there is one CPU that operates the software switch 110. The example in FIG. 5 illustrates a case where a communication speed of a physical network is 1 Gbps.

The software switch 110 periodically executes each task. br_out (pif) indicates a task of the output processing unit 302c. br_in (pif) indicates a task of the input processing unit 301c. br_out (vif 1) indicates a task of the output processing unit 302a. br_in (vif 1) indicates a task of the input processing unit 301a. br_out (vif 2) indicates a task of the output processing unit 302b. br_in (vif 2) indicates a task of the input processing unit 301b.

FIG. 6 is a diagram for illustrating an example of controlling a task of the switch device 100-3 according to the first embodiment.

An alarm unit 306 notifies, when designated time has elapsed, a selection unit 307. An operation of the alarm unit 306 may be an operation of repeating notification at regular intervals (a set time period) or an operation of giving a notice once when designated time has elapsed.

The selection unit 307 is activated by a notification of the alarm unit 306, refers to task schedule information 308, and selects a task to be activated.

In the task schedule information 308, information that indicates activation timing of a task is stored.

Figure 7A:
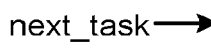
FIG. 7A is a diagram for illustrating a first example of task schedule information according to the first embodiment.

FIG. 7A is a diagram for illustrating a first example of the task schedule information 308 according to the first embodiment. The example in FIG. 7A illustrates a case where an activation cycle (tick) is constant (1000 ns). In other words, the example of the task schedule information 308 in FIG. 7A illustrates a case where execution times of all tasks are identical. In this case, the alarm unit 306 wakes up at intervals of 1000 ns and repeats an operation of notifying the selection unit 307.

A base_time (GCL) indicates a start time (reference time) of gate control using a gate control list of IEEE 802.1 Qbv that is an example of transmission schedule information. In transmission schedule information, transmission timing of data is determined for each priority of the data.

A next_task (ID) indicates a task to be executed next.

Figure 7B:
FIG. 7B is a diagram for illustrating a second example of the task schedule information according to the first embodiment.

FIG. 7B is a diagram for illustrating a second example of the task schedule information 308 according to the first embodiment. The example in FIG. 7B illustrates a case where allocated execution times differ for each task. In this case, the selection unit 307 sets time before next wake-up each time in the alarm unit 306.

In the examples in FIGS. 7A and 7B, the selection unit 307 selects a task (br_out (vif 2)) with ID=5 designated as a next_task. Next, the selection unit 307 updates a next_task and designates a task to be selected at a time of next activation.

Finally, the selection unit 307 calculates an end time of a task and activates the selected task. An end time of a task may be, but not limited to, a value obtained by adding task execution time (a value of tick in the case of FIG. 7A) to a current time, a cumulative value of task execution times from a reference time (base_time), a value considering fluctuations in execution time into these values, or the like.

In the descriptions of FIGS. 7A and 7B, a case where the selection unit 307 calculates an end time of a task has been described, but the selection unit 307 may notify each task of task execution time (a tick value in the case of FIG. 7A) to make each task calculate an end time.

Here, supplementary information on the task schedule information 308 will be added. The task schedule information 308 in FIGS. 7A and 7B includes, but not limited to, information that indicates each task arranged in an order of execution, a reference time (base_time) at a time of activating a task, and information on a task to be executed next (next_task).

A time when an alarm is first activated is a time designated as a base_time. Here, in the first embodiment, for example, a value of a reference time used for transmission schedule information (information used in gate control of IEEE 802.1 Qbv) of data (frame) is set as a base_time.

In other words, transmission schedule information and the task schedule information 308 are synchronized by matching a start time of task selection control with a start time of transmission timing control based on transmission schedule information.

When a value (variable) different from a reference time of data transmission schedule information is provided as a base_time, a base_time of the task schedule information 308 and each reference time of data transmission schedule information are synchronized.

Referring back to the description of FIG. 6. In the example in FIG. 6, tasks included in the task schedule information 308 are the input processing units 301a to 301c and the output processing units 302a to 302c. For example, a task of deleting old entries of a forwarding/filtering database (FDB) (fdb_clean in FIG. 7A), a task of processing switch statistical information, and the like may be included in task schedule information. In addition, a task designated by task schedule information is assumed to be a non-preemptive task and is a task that is not interrupted by other tasks during execution.

The input buffer 303 is a buffer used when transferring data from the virtual machine 13 to the switch device 100-3. The input buffer 303 may be provided on a switch side, on a virtual machine side, or on a side of a virtual machine monitor ((VMM) or a hypervisor). In a case of IEEE 802.1 Qbv, the input buffer 303 is a queue divided for each traffic class.

Upon receipt of a notification from the selection unit 307, the input processing unit 301 is activated, reads data (frame) of the input buffer 303, determines a transfer destination, and writes the data in a corresponding transfer buffer 304.

The transfer buffer 304 is a buffer used when transferring data from the input processing unit 301 to the output processing unit 302. In the case of IEEE 802.1 Qbv, the transfer buffer 304 is a queue divided for each traffic class.

Upon receipt of a notification from the selection unit 307, the output processing unit 302 is activated, reads data of the transfer buffer 304, and writes the data in the output buffer 305.

The output buffer 305 is a buffer used when transferring data from the switch device 100-3 to the virtual machine 13 or the NIC 30. The output buffer 305 may be provided on a switch side, on a virtual machine side, or on a side of a virtual machine monitor ((VMM) or a hypervisor).

In the description of FIG. 6, a case where the input processing unit 301 is provided for each network port (the virtual machine 13 and the NIC 30) has been described, but for example, a single input processing unit 301 may be provided to switch between network ports to be referred to. This also applies to the output processing unit 302.

Further, for example, the input processing unit 301 and the output processing unit 302 that execute input/output control of a virtual interface (the virtual machine 13) and the input processing unit 301 and the output processing unit 302 that execute input/output control of a physical interface (the NIC 30) may be controlled separately.

FIG. 8 is a flowchart for illustrating an example of activation processing of the task according to the first embodiment. First, the selection unit 307 refers to the task schedule information 308 and selects a task to be activated (Step S1). Next, the selection unit 307 updates, by designating a next_task indicating a task to be executed next, the task schedule information 308 (Step S2). Next, the selection unit 307 calculates an end time of the task selected by the processing of Step S1 by the above-described method (Step S3). Next, the selection unit 307 activates the task selected by the processing of Step S1 (Step S4). Next, the task selected by the processing of Step S1 executes processing of the task (Step S5).

The above is a task activation operation of the switch device 100-3 according to the first embodiment. Next, operations of the input processing unit 301 and the output processing unit 302 activated by the selection unit 307 will be described.

Processing of Input Processing Unit

Figure 9:
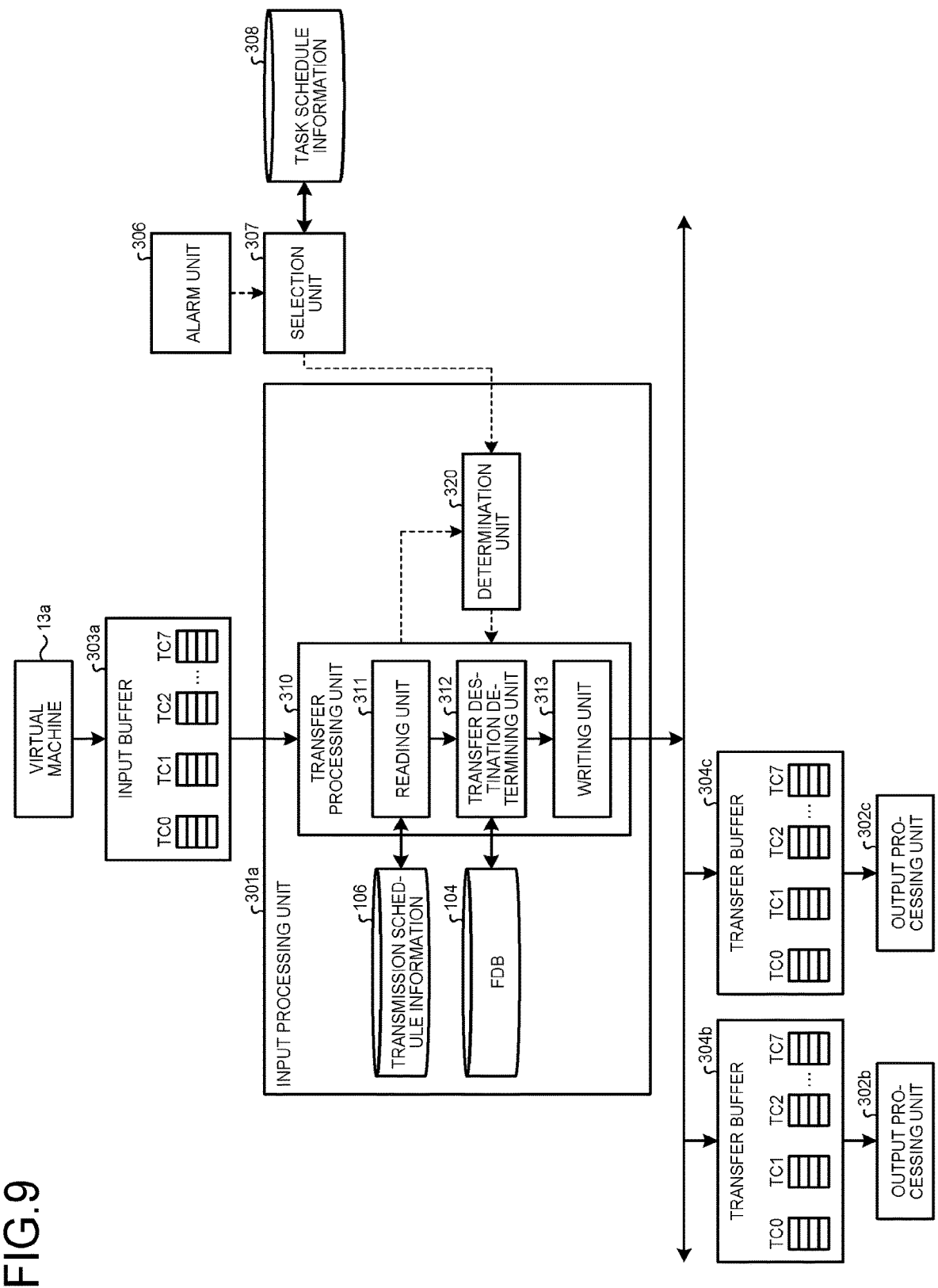
FIG. 9 is a diagram for illustrating an example of a functional configuration of an input processing unit according to the first embodiment.

FIG. 9 is a diagram for illustrating an example of a functional configuration of the input processing unit 301a according to the first embodiment. The input processing unit 301a according to the first embodiment includes the FDB 104, transmission schedule information 106, a transfer processing unit 310, and a determination unit 320. The transfer processing unit 310 includes a reading unit 311, a transfer destination determining unit 312, and a writing unit 313.

The determination unit 320 holds worst-case processing time necessary for transferring one frame. Worst-case processing time is calculated in consideration of frame processing time of a maximum frame length, search time of transmission schedule information 106, search time of the FDB 104, processing time of broadcast, and the like.

With respect to search time of transmission schedule information 106, for example, in the case of IEEE 802.1 Qbv, it is confirmed whether a transmission frame exists in order from a traffic class with a high priority. Therefore, when a frame exists in a traffic class with a lowest priority, it takes longest time in processing.

Regarding search time of the FDB 104, for example, when the FDB 104 is managed with a hash, processing time fluctuates due to presence or absence of a collision of hash values, for example.

Regarding processing time of broadcast, for example, processing at a time of broadcast increases according to the number of network ports.

The determination unit 320 determines, from a current time, worst-case processing time, and an end time received by the selection unit 307, whether transmission of one frame is possible.

The transmission schedule information 106 holds information that indicates pre-set transmission timing of a frame. In the case of IEEE 802.1 Qbv, the transmission schedule information 106 is a gate control list (GCL) and various information (including a reference time) necessary for gate control.

The FDB 104 includes information for determining a transmission destination of a frame. In the first embodiment, information such as an identifier, a MAC address, a VLAN ID, and a last transmission time of a network port (network interface) at a transfer destination is stored.

The transfer processing unit 310 reads data (frame) from the input buffer 303a while controlling timing based on the transmission schedule information 106. In the example in FIG. 9, data is read from any one of buffers in traffic classes (TCs) 0 to 7 included in the input buffer 303a. Next, the transfer processing unit 310 refers to the FDB 104 to determine a network port serving as a destination and writes data in a corresponding transfer buffer 304. Upon completion of data writing, the transfer processing unit 310 notifies the determination unit 320. Transfer processing is repeated until it is determined by the determination unit 320 that processing is unable to be executed.

Figure 10:
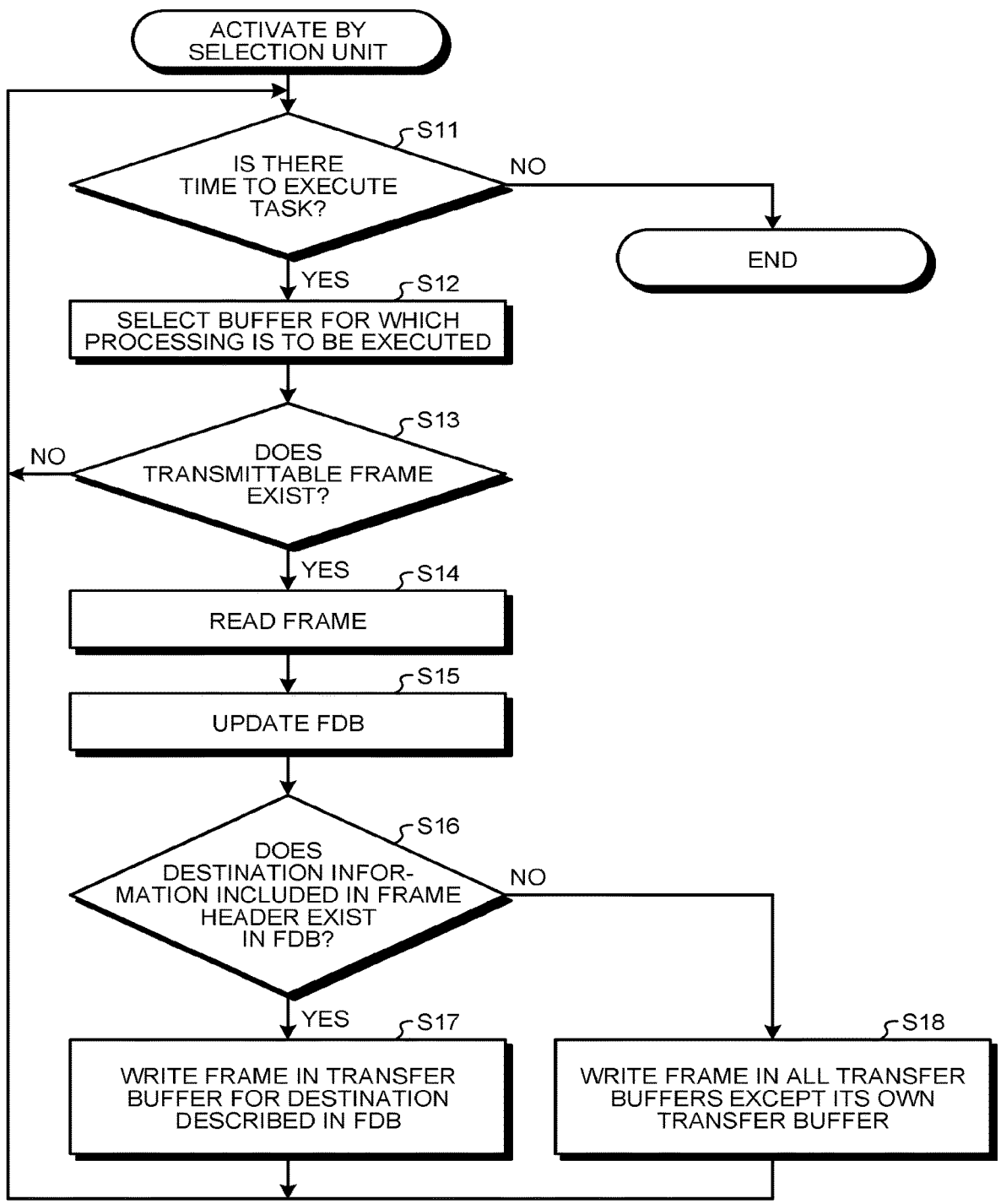
FIG. 10 is a flowchart for illustrating an example of data input processing according to the first embodiment.

FIG. 10 is a flowchart for illustrating an example of data input processing according to the first embodiment. First, the determination unit 320 determines whether there is time to execute processing of the input processing unit 301 (task) (Step S11).

Next, the reading unit 311 selects, based on the transmission schedule information 106, an input buffer (any one of the TCs 0 to 7 in the example in FIG. 9) for which transfer processing is to be executed (Step S12). Next, the reading unit 311 determines whether transmittable data (frame) exists in the input buffer selected in Step S12 (Step S13). When no transmittable frame exists (Step S13, No), processing returns to Step S11.

When a transmittable frame exists (Step S13, Yes), the reading unit 311 reads a frame from the buffer selected in Step S12 (Step S14). Next, the transfer destination determining unit 312 updates the FDB 104 based on transmission source information included in a header of the frame (Step S15).

Next, the transfer destination determining unit 312 determines whether destination information included in the header of the frame exists in the FDB 104 (Step S16). When destination information included in the header of the frame exists in the FDB 104 (Step S16, Yes), the frame is transmitted by unicast. Specifically, the writing unit 313 writes the frame read in the processing of Step S14 in the transfer buffer 304 for a destination described in the FDB 104 (Step S17).

When destination information included in the header of the frame does not exist in the FDB 104 (Step S16, No), the frame is transmitted by broadcast. More specifically, the writing unit 313 writes the frame read in the processing of Step S14 in all transfer buffers 304 except its own transfer buffer 304 (Step S18).

Here, supplementary information on the processing of the transfer destination determining unit 312 will be added.

Supplement for Update Processing of FDB 104

When an entry including "transmission source" information (MAC address and VLAN ID) of the read frame exists in the FDB 104, the transfer destination determining unit 312 updates the FDB 104 by setting a current time at a last transfer time of the entry. Note that old entries (entries that have not been transmitted for a long time) are deleted using a last transmission time. For example, when an fdb_clean task is executed, old entries are deleted in order of last transmission time.

On the other hand, when an entry including "transmission source" information (MAC address and VLAN ID) of the read frame does not exist in the FDB 104, the transfer destination determining unit 312 updates the FDB 104 by newly registering the entry.

Supplement for Unicast/Broadcast

When an entry including "destination" information (MAC address, VLAN ID) of the read frame exists in the FDB 104, the transfer destination determining unit 312 transfers the frame by unicast.

On the other hand, when an entry including "destination" information (MAC address, VLAN ID) of the read frame does not exist in the FDB 104, the transfer destination determining unit 312 transfers the frame by broadcast.

Processing of Output Processing Unit

Figure 11:
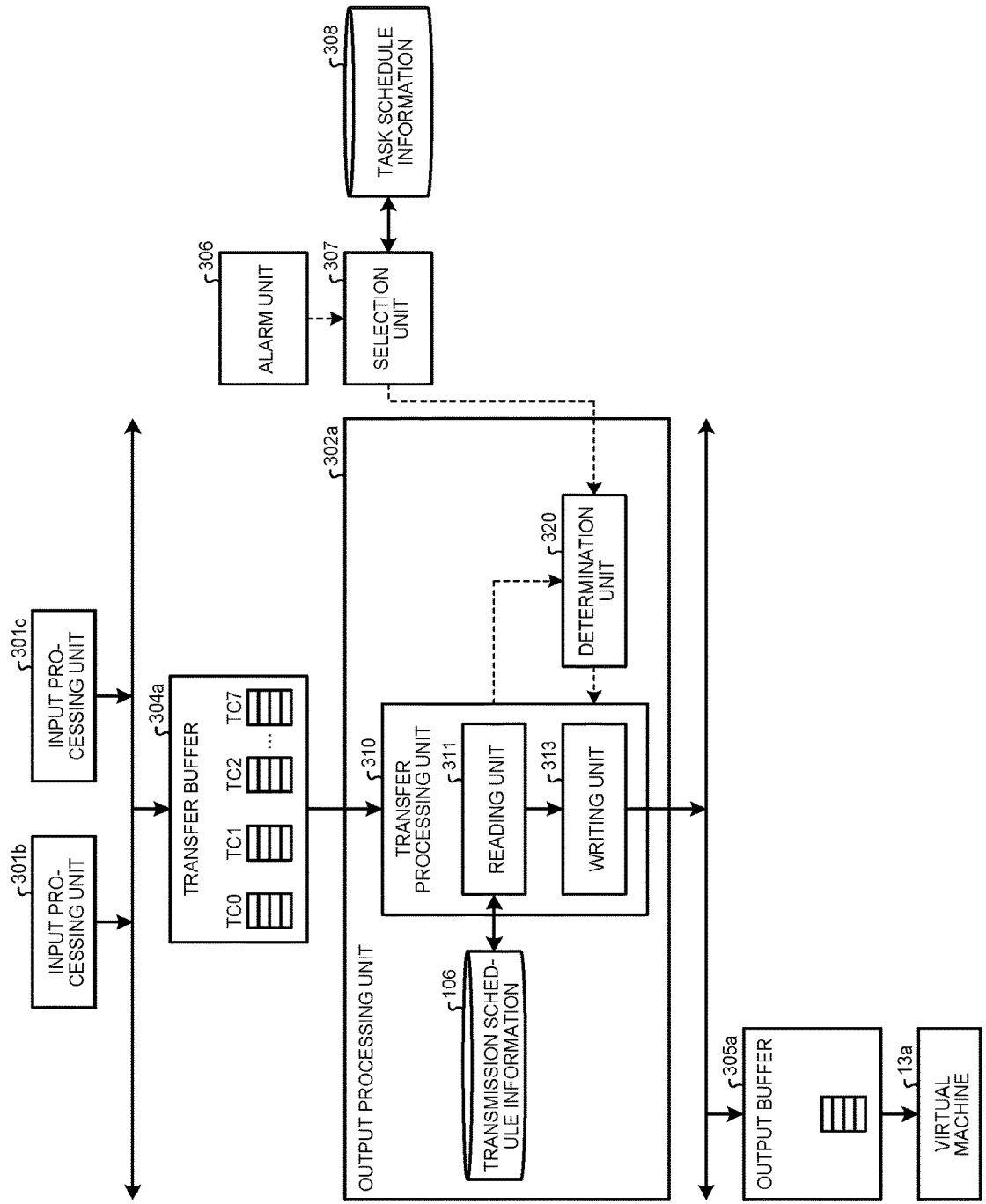
FIG. 11 is a diagram for illustrating an example of a functional configuration of an output processing unit according to the first embodiment.

FIG. 11 is a diagram for illustrating an example of a functional configuration of the output processing unit 302a according to the first embodiment. The output processing unit 302a according to the first embodiment includes the transmission schedule information 106, the transfer processing unit 310, and the determination unit 320. The transfer processing unit 310 includes the reading unit 311 and the writing unit 313. Descriptions of the transmission schedule information 106, the transfer processing unit 310 (the reading unit 311 and the writing unit 313), and the determination unit 320 are similar to those of FIG. 9 and thus will be omitted.

Figure 12:
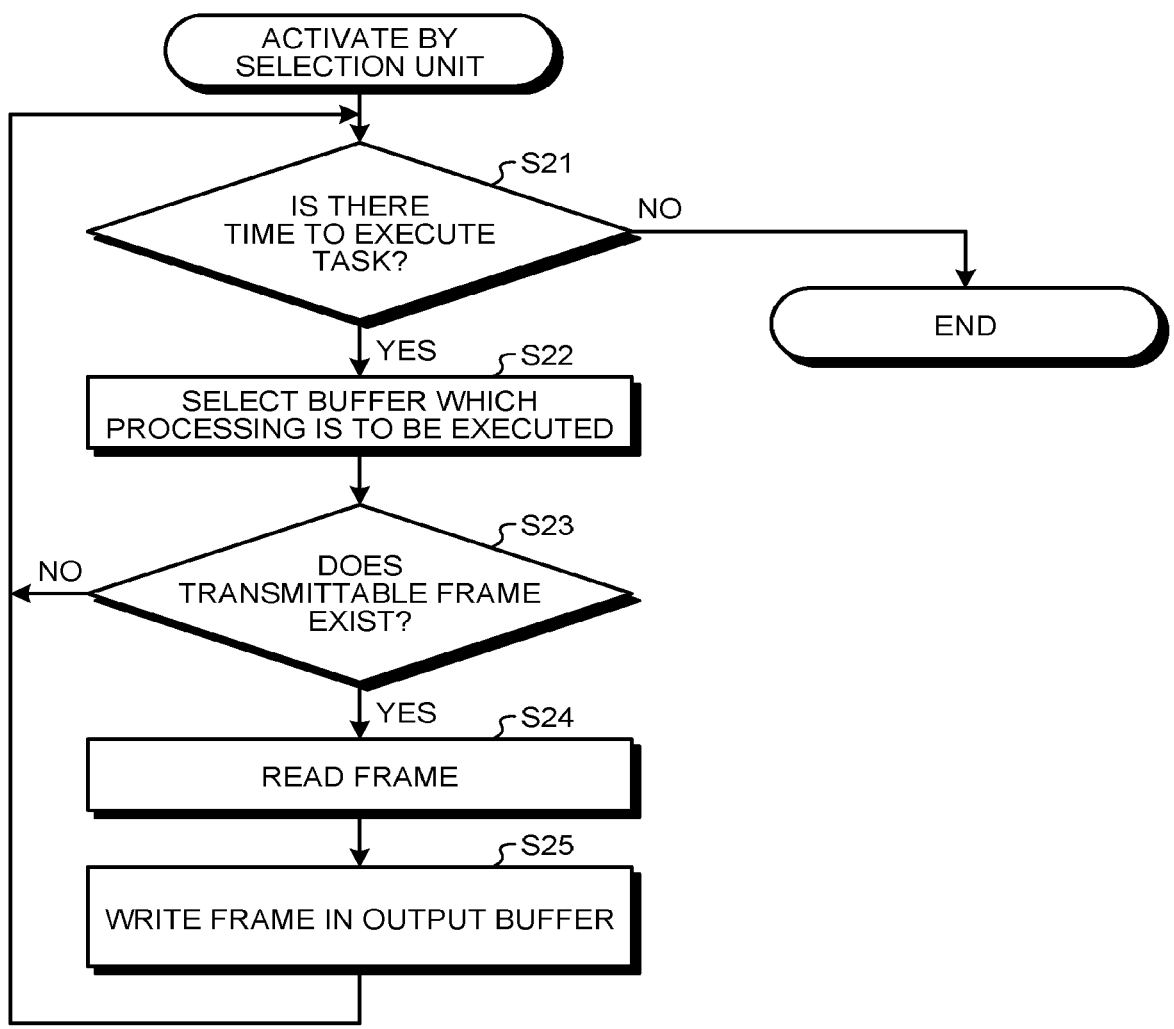
FIG. 12 is a flowchart for illustrating an example of data output processing according the first embodiment.

FIG. 12 is a flowchart for illustrating an example of data output processing according to the first embodiment. Descriptions of Steps S21 to S24 are similar to those of Steps S11 to S14 in FIG. 10 and thus will be omitted. The writing unit 313 writes the data (frame) read by processing of Step S24 in the output buffer 305 (Step S25).

As described above, in the switch device 100-3 according to the first embodiment, the selection unit 307 selects, based on the task schedule information 308 synchronized with the transmission schedule information 106 where transmission timing of data (first data) is determined for each priority of the first data, a task (first task) of executing transfer processing of the first data and calculates an end time of the transfer processing executed by the selected first task. The determination unit 320 determines, from the end time and a current time, whether transfer processing of the first data is executable. Then, the first task selected by the selection unit 307 executes, when transfer processing is executable, the transfer processing of the first data based on the transmission schedule information 106.

Effects of First Embodiment

Figure 13:
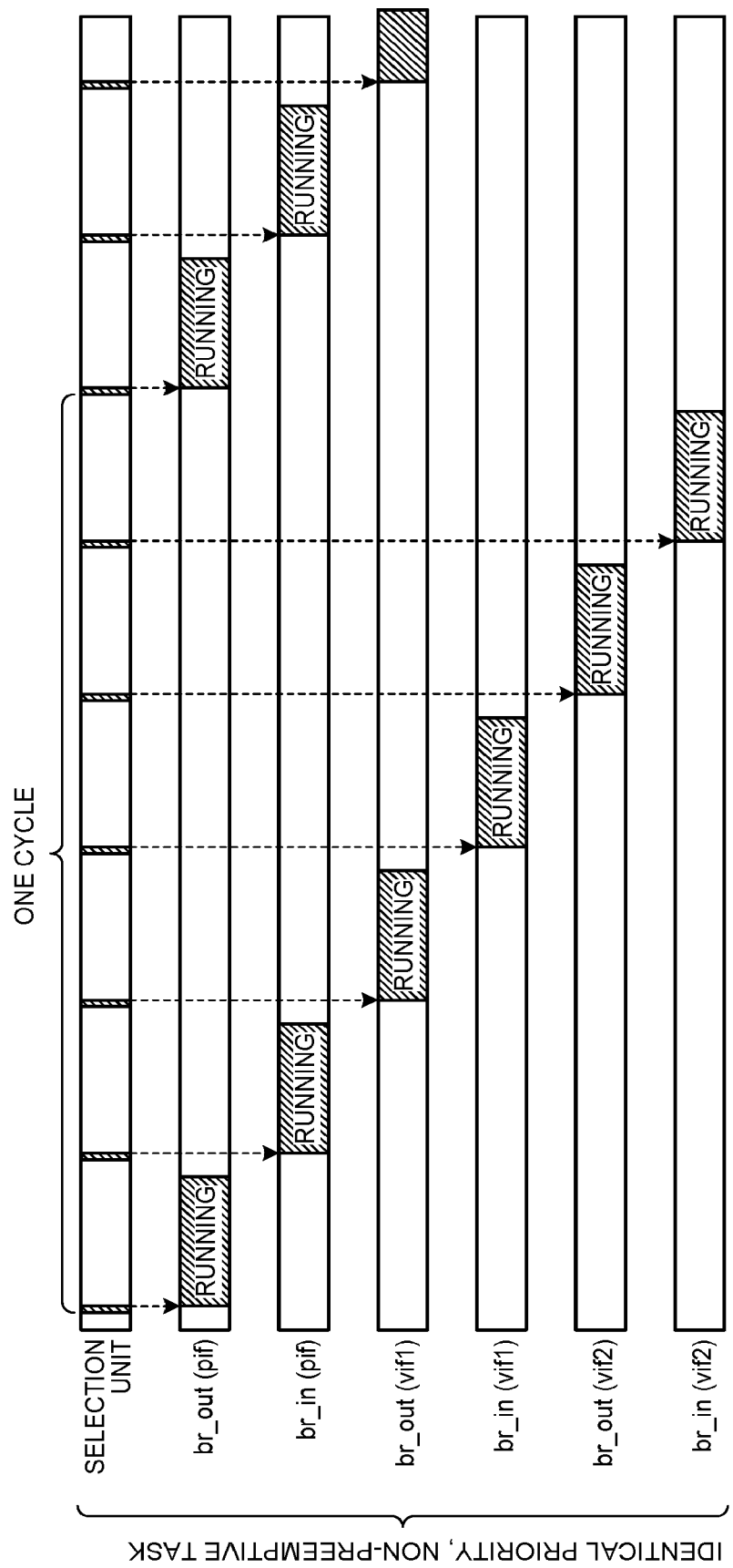
FIG. 13 is a diagram for illustrating an image of executing the task according to the first embodiment.

With the switch device 100-3 according to the first embodiment, by controlling activation timing of a task in synchronization with transmission timing of data (frame), each task is processed in order at timing scheduled in advance as illustrated in FIG. 13.

FIG. 13 is a diagram for illustrating an image of executing the task according to the first embodiment. The selection unit 307 is activated at regular intervals by, for example, an alarm function of a real-time operating system (RTOS). The selection unit 307 wakes up a task based on the task schedule information 308 managed internally.

A task to be woken up is any one of a br_out (pif), a br_in (pif), a br_out (vif 1), a br_in (vif 1), a br_out (vif 2), and a br_in (vif 2). Descriptions of the br_out (pif), the br_in (pif), the br_out (vif 1), the br_in (vif 1), the br_out (vif 2), and the br_in (vif 2) are identical to those of FIG. 5 and thus will be omitted.

A task that has been woken up executes, during execution time designated by the task schedule information 308, frame transfer processing by a polling operation.

By operation of each task as illustrated in FIG. 13, task execution time is strictly managed, and unpredictable fluctuations in processing time (fluctuations in processing time hard to estimate due to a context switch, for example) can be eliminated. This makes it possible to guarantee a worst-case delay.

In the above description, for the sake of simplicity, a case of three network ports has been described, but the number of network ports may be arbitrary.

Second Embodiment

Next, a second embodiment will be described. In description of the second embodiment, descriptions similar to those of the first embodiment will be omitted. In the second embodiment, a case where a task interrupt is further controlled will be described.

Figure 14:
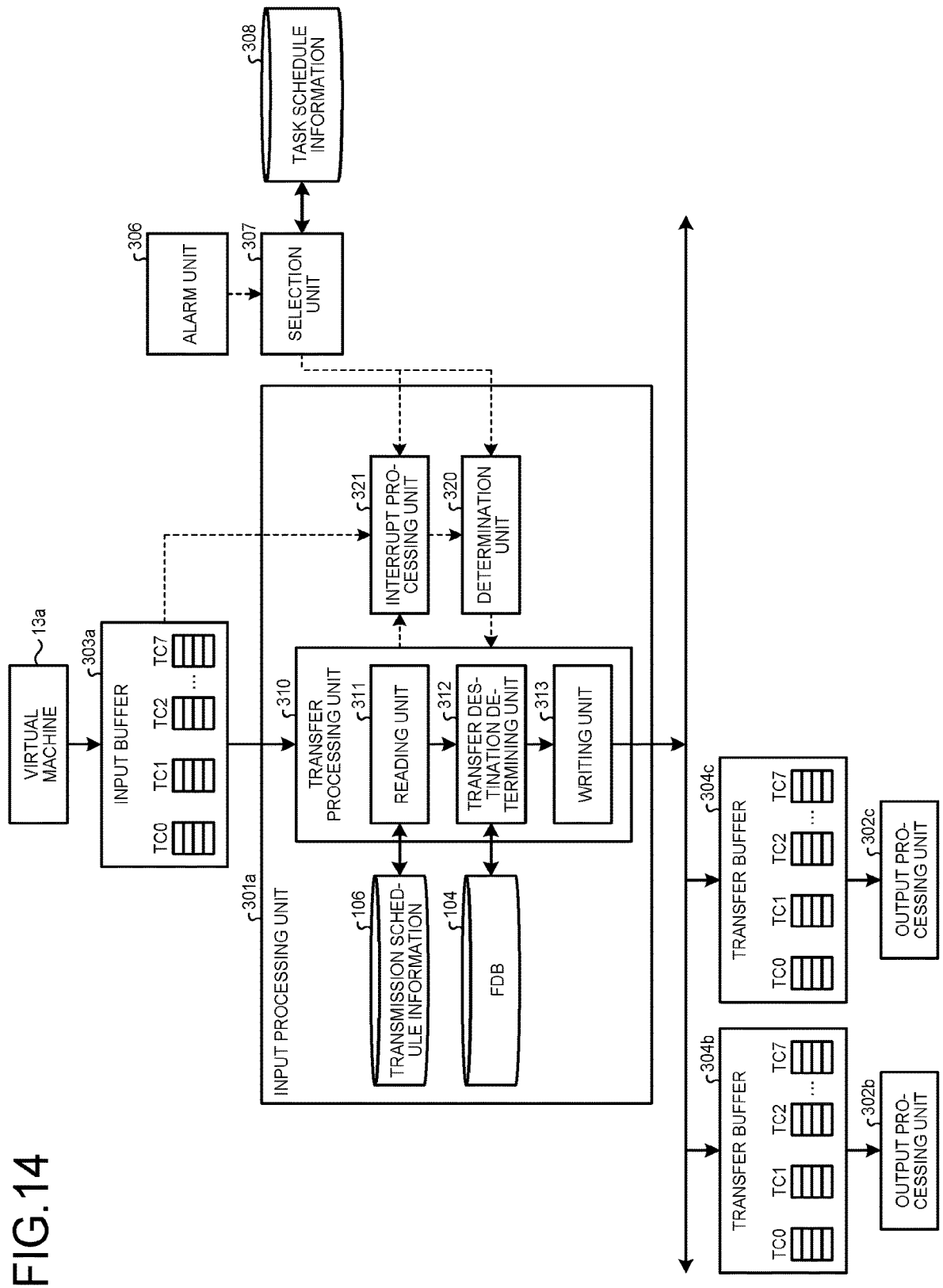
FIG. 14 is a diagram for illustrating an example of a functional configuration of an input processing unit according to a second embodiment.

FIG. 14 is a diagram for illustrating an example of a functional configuration of the input processing unit 301a according to the second embodiment. The input processing unit 301a according to the second embodiment includes the FDB 104, the transmission schedule information 106, the transfer processing unit 310, the determination unit 320, and an interrupt processing unit 321. The transfer processing unit 310 includes a reading unit 311, a transfer destination determining unit 312, and a writing unit 313.

FIG. 15 is a diagram for illustrating an example of a functional configuration of the output processing unit 302a according to the second embodiment. The output processing unit 302a according to the second embodiment includes the transmission schedule information 106, the transfer processing unit 310, the determination unit 320, and the interrupt processing unit 321. The transfer processing unit 310 includes the reading unit 311 and the writing unit 313.

In other words, in the second embodiment, the interrupt processing unit 321 is further added to the configuration according to the first embodiment.

The interrupt processing unit 321 detects an interrupt signal generated when the virtual machine 13a writes data (frame) in the input buffer 303a or an interrupt signal generated when the input processing unit 301 writes data in the transfer buffer 304a, and when an interrupt is enabled, notifies the determination unit 320. Whether an interrupt is enabled is controlled by an interrupt mask. An interrupt signal may be generated by a driver of the virtual machine 13a when a frame is input, may be generated by the input processing unit 301 when a frame is written in a transfer buffer, or may be generated by a hypervisor. Also, instead of using an interrupt signal, a method for detecting input of a frame by monitoring, by polling, the input buffer 303a and the transfer buffer 304a by the input processing unit 301a (the interrupt processing unit 321) and the output processing unit 302a, respectively may be substituted.

FIG. 16A is a diagram for illustrating a first example of task schedule information 308 according to the second embodiment. The example in FIG. 16A illustrates a case where an activation cycle (tick) is constant (1000 ns). In other words, the example of the task schedule information 308 in FIG. 16A illustrates a case where execution times of all tasks are identical. In this case, the alarm unit 306 wakes up at intervals of 1000 ns and repeats an operation of notifying the selection unit 307.

FIG. 16B is a diagram for illustrating a second example of the task schedule information 308 according to the second embodiment. The example in FIG. 16B illustrates a case where allocated execution times differ for each task. In this case, the selection unit 307 sets time before next wake-up each time in the alarm unit 306.

In the second embodiment, a prev_task (ID) indicating a task previously executed is added.

When activating a selected task, the selection unit 307 sets the interrupt processing unit 321 of a previously executed task (prev_task) to disable (mask) an interrupt. Next, the selection unit 307 notifies the determination unit 320 of a task to be activated (next_task) of an end time and activates the task (next_task).

The input processing unit 301 (the output processing unit 302) executes processing similar to one according to the first embodiment but enables and ends interrupt processing of the interrupt processing unit 321, if no data (frame) exists when the reading unit 311 refers to a buffer.

When a frame is input into a queue before the alarm unit 306 is newly operated (when the alarm unit 306 is activated, an interrupt is disabled), the frame is detected by the interrupt processing unit 321, and frame transfer processing is restarted.

Figure 17:
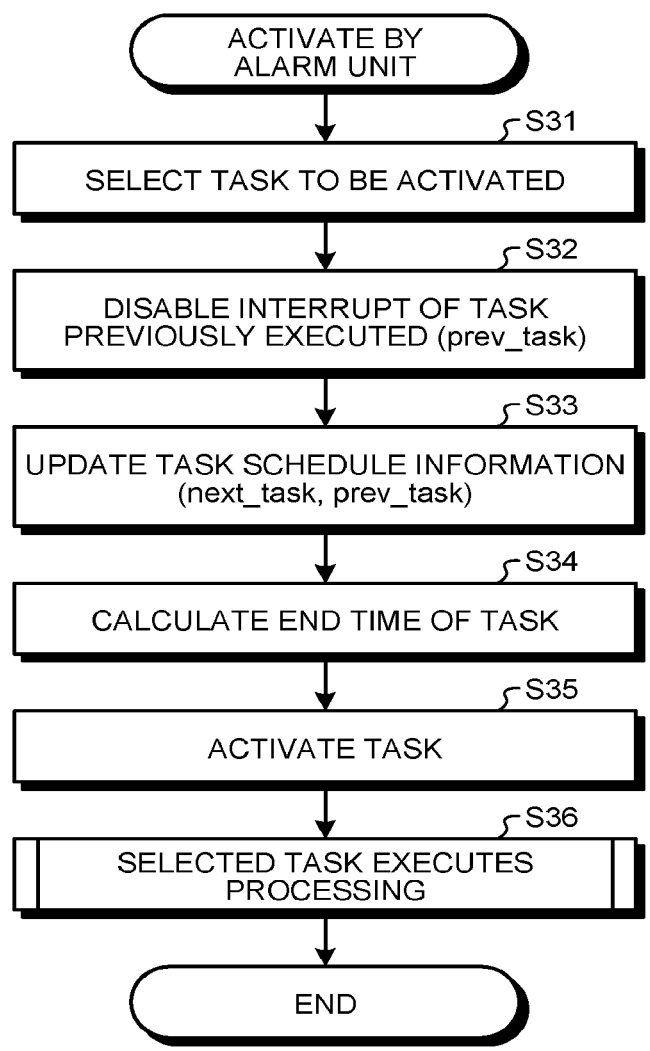
FIG. 17 is a flowchart for illustrating an example of activation processing of a task according to the second embodiment.

FIG. 17 is a flowchart for illustrating an example of activation processing of a task according to the second embodiment. First, the selection unit 307 refers to the task schedule information 308 and selects a task to be activated (Step S31). Next, the selection unit 307 disables an interrupt of a task (prev_task) previously executed (Step S32).

Next, the selection unit 307 updates a next_task and a prev_task of the task schedule information 308 (Step S33). Next, the selection unit 307 calculates an end time of the task selected by the processing of Step S31 by a method similar to one according to the first embodiment (Step S34). Next, the selection unit 307 activates the task selected by the processing of Step S31 (Step S35). Next, the task selected by the processing of Step S31 executes processing of the task (Step S36).

Figure 18:
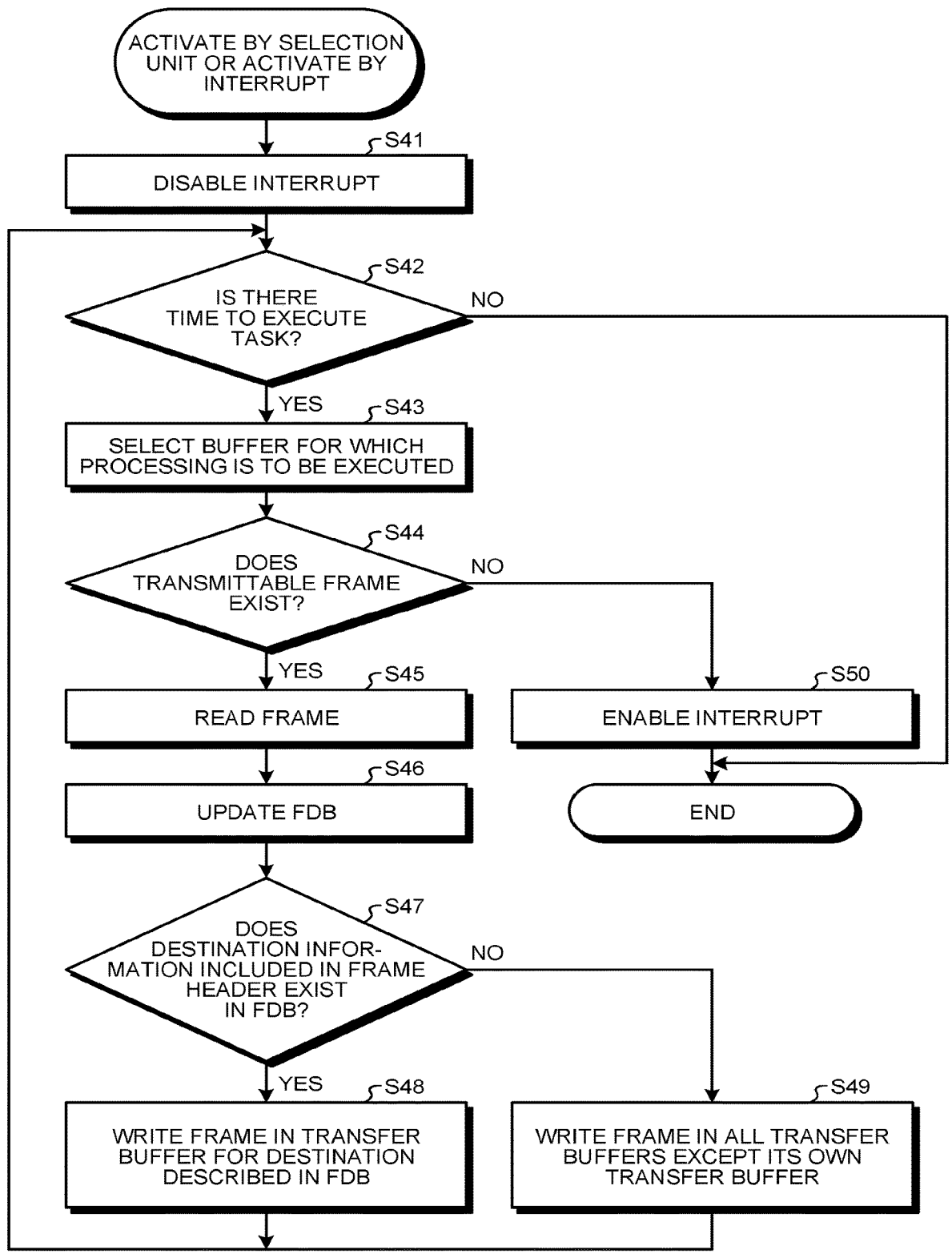
FIG. 18 is a flowchart for illustrating an example of data input processing according to the second embodiment.

FIG. 18 is a flowchart for illustrating an example of data input processing according to the second embodiment. First, the interrupt processing unit 321 disables an interrupt during task execution (Step S41).

Descriptions of Steps S42 to S49 are similar to those in the first embodiment and thus will be omitted.

In the second embodiment, when no transmittable frame exists (Step S44, No), an interrupt is enabled (Step S50).

Figure 19:
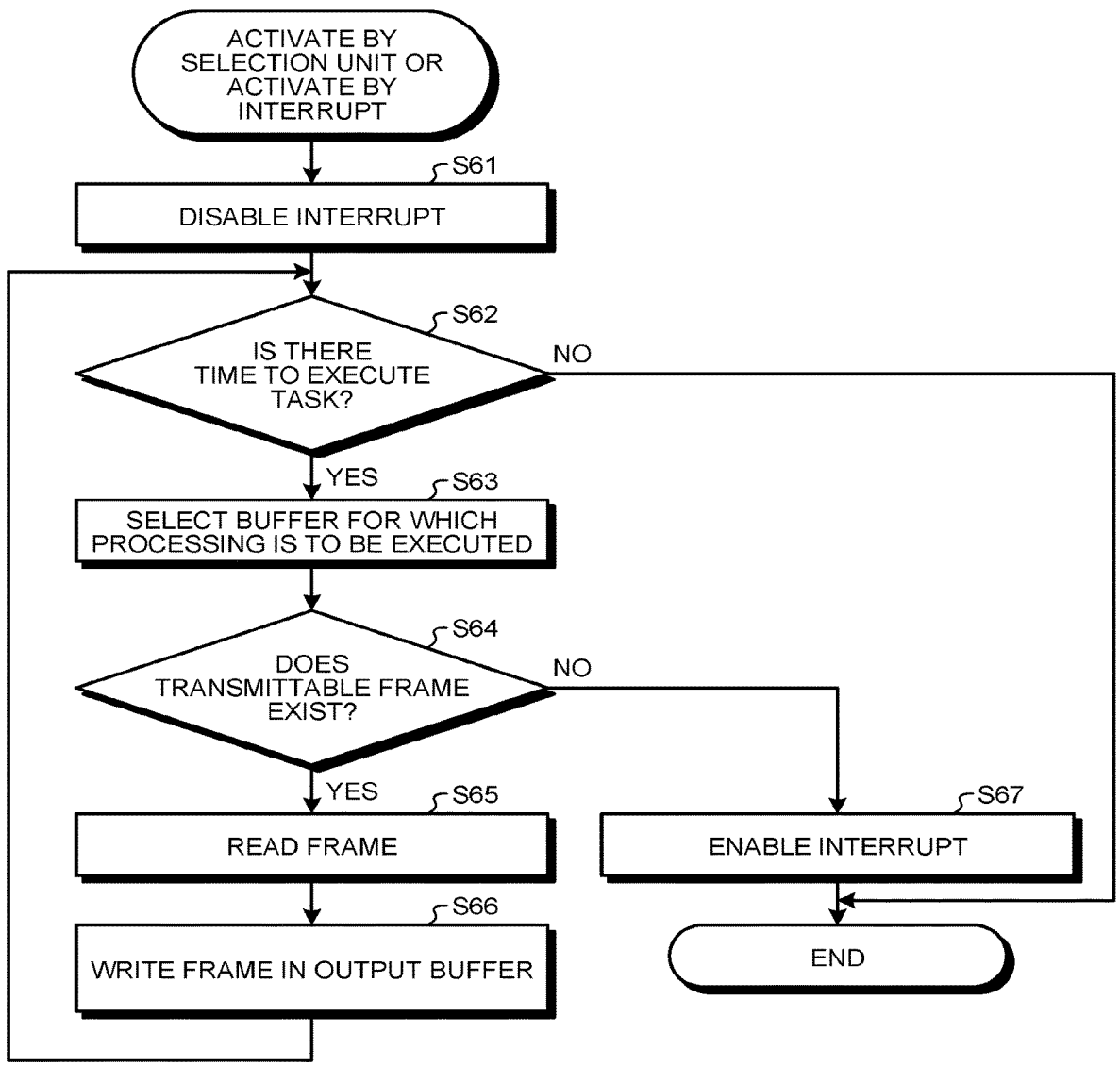
FIG. 19 is a flowchart for illustrating an example of data output processing according to the second embodiment.

FIG. 19 is a flowchart for illustrating an example of data output processing according to the second embodiment. First, the interrupt processing unit 321 disables an interrupt during task execution (Step S61). Descriptions of Steps S62 to S65 are similar to those of Steps S42 to S45 in FIG. 18 and thus will be omitted. The writing unit 313 writes data (frame) read by the processing of Step S65 in the output buffer 305 (Step S66).

In the second embodiment, when no transmittable frame exists (Step S64, No), an interrupt is enabled (Step S67).

Figure 20:
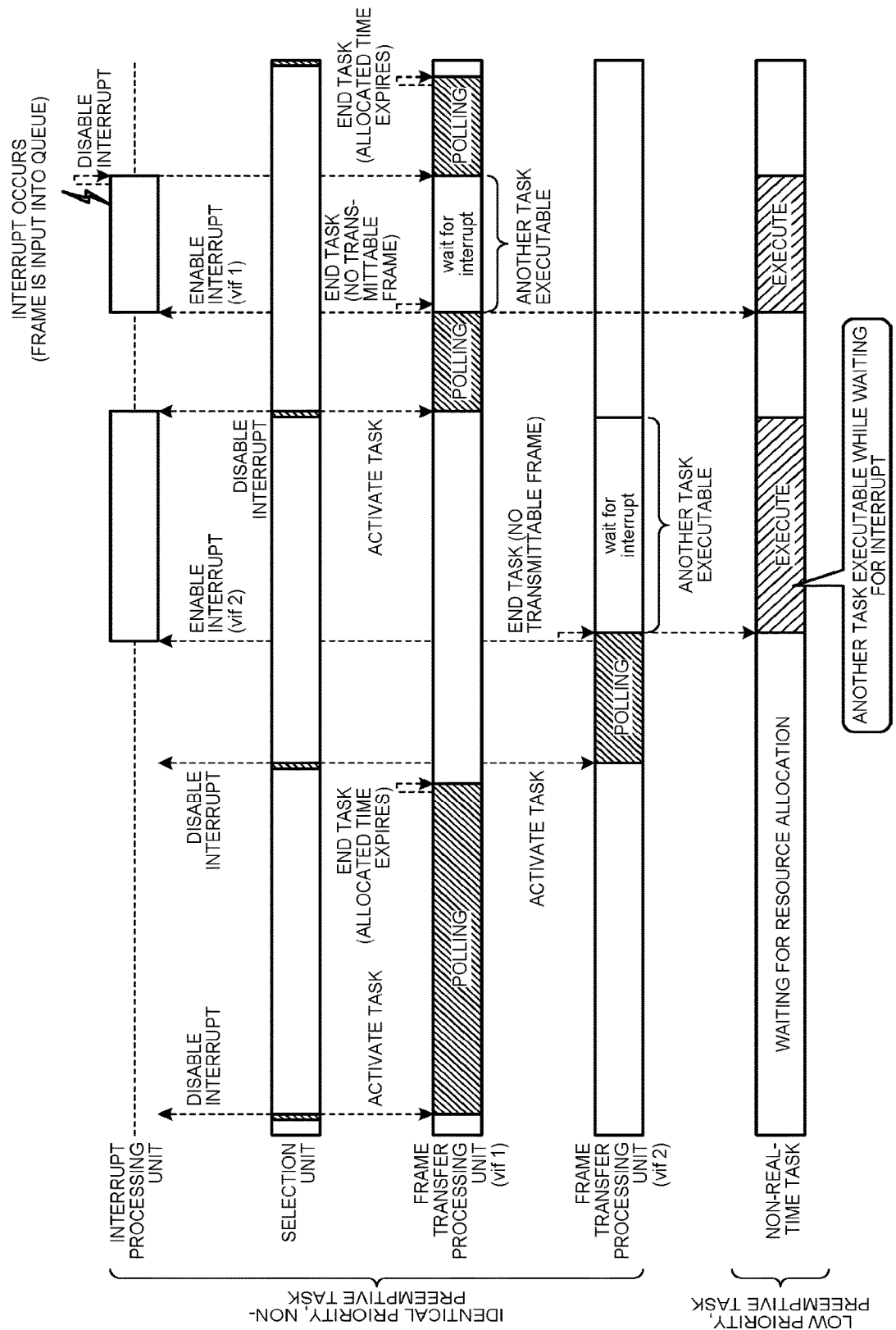
FIG. 20 is a diagram for illustrating an image of executing the task according to the second embodiment.

FIG. 20 is a diagram for illustrating an image of executing the task according to the second embodiment. In the first embodiment, even when no data (frame) exists, an operation is repeated until an end time of a task (polling operation). On the other hand, in the second embodiment, when no transmittable frame exists during task execution, an interrupt is enabled to end an operation. As a result, as illustrated in FIG. 20, when no frame exists, another task can be executed (a hybrid of interrupt processing and polling). However, when a frame is input into a queue, the transfer processing unit 310 immediately resumes transfer processing. Thus, a task executed during suspension of the transfer processing unit 310 needs to be a preemptive task with a low priority (task that allows an interrupt of processing).

A preemptive task is a task of executing processing with a low requirement for real-time performance, such as a task of deleting old entries of an FDB, statistical information processing of a switch, and transfer processing of best effort traffic that is not real-time communication.

Specifically, when transfer processing of a non-preemptive task (first task) is suspended, the selection unit 307 selects a second task of executing transfer processing of a preemptive task (second data) (in the example in FIG. 20, non-real-time task). Then, the second task selected by the selection unit 307 executes transfer processing of the second data until the first task to which an interrupt has been enabled or a new first task is selected by the selection unit 307.

A condition for shifting to an interrupt operation (a condition for determining that no transmittable frame exists) is, for example, a case where a buffer is empty. Another condition for shifting to an interrupt operation is, for example, a case where a frame exists in a buffer but a gate is closed. A further condition for shifting to an interrupt operation is, for example, a case where a frame exists in a buffer and a gate is open, but transmission is unable to be executed by Qbv guard band determination.

As described above, in the switch device 100-3 according to the second embodiment, upon detecting input of first data into a buffer referred to by a task (first task), the interrupt processing unit 321 notifies the determination unit 320 when an interrupt to the first task is enabled. When selecting a first task, the selection unit 307 disables an interrupt to the first task to be selected. The first task selected by the selection unit 307 enables, when the first data that can be transferred does not exist in a buffer during transfer processing, an interrupt to suspend transfer processing. Then, the determination unit 320 determines, when notified by the interrupt processing unit 321, whether transfer processing of the first data is executable by the first task to which an interrupt has been enabled.

Effects of Second Embodiment

According to the second embodiment, activation timing of a task is controlled in synchronization with transmission timing of data (frame), and when no transmittable frame exists during execution of a task of frame transfer processing, another task can be executed. This makes it possible to improve processing efficiency while guaranteeing a worst-case delay in processing.

Third Embodiment

Next, a third embodiment will be described. In description of the third embodiment, descriptions similar to those of the second embodiment will be omitted. In the third embodiment, a case where an interrupt is controlled in consideration of a state of a buffer and changes in state of the transmission schedule information 106 will be described.

Figure 21:
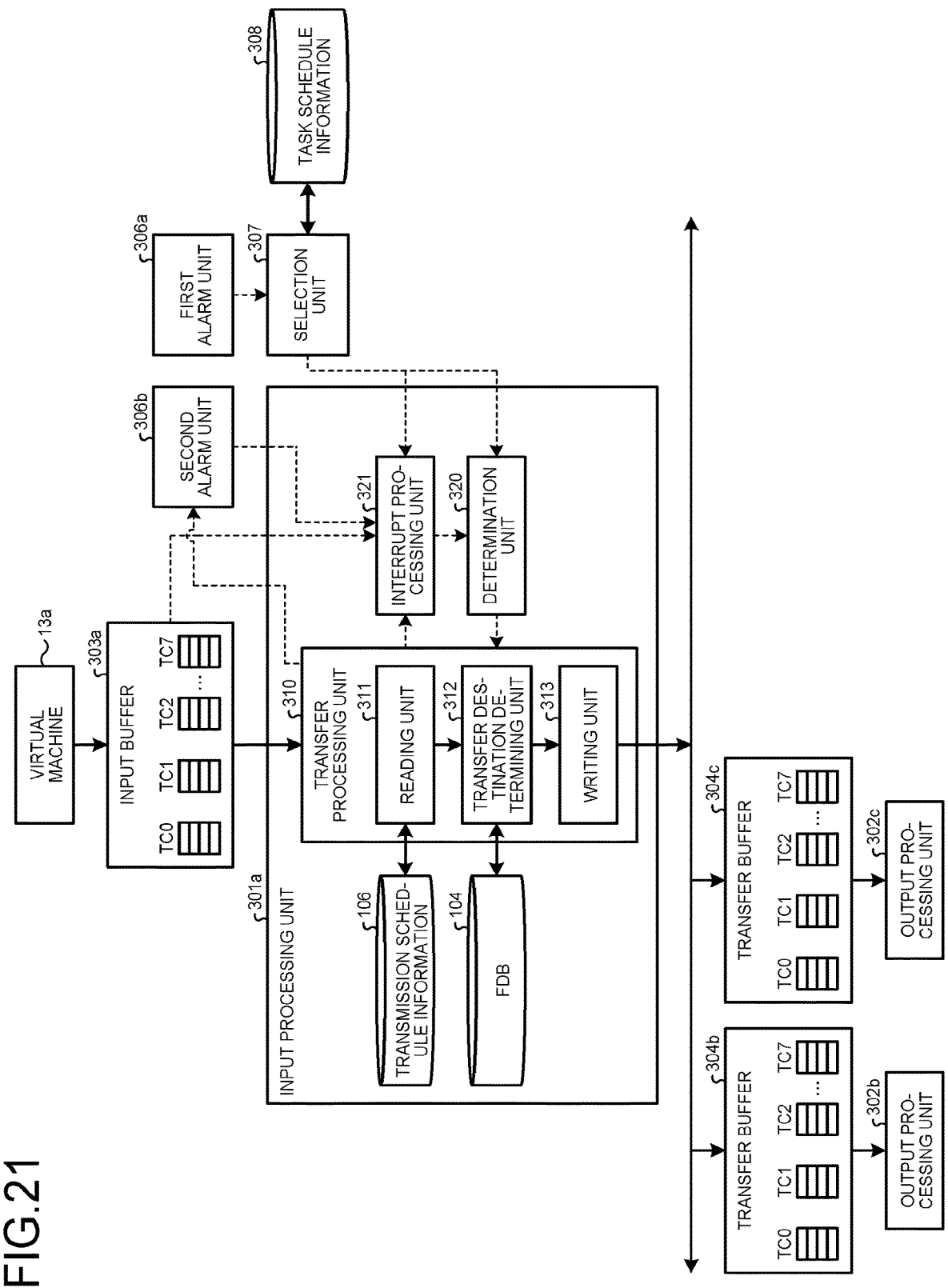
FIG. 21 is a diagram for illustrating an example of a functional configuration of an input processing unit according to a third embodiment.

FIG. 21 is a diagram for illustrating an example of a functional configuration of the input processing unit 301a according to the third embodiment. The input processing unit 301a according to the third embodiment includes the FDB 104, the transmission schedule information 106, the transfer processing unit 310, the determination unit 320, and the interrupt processing unit 321. The transfer processing unit 310 includes a reading unit 311, a transfer destination determining unit 312, and a writing unit 313.

Figure 22:
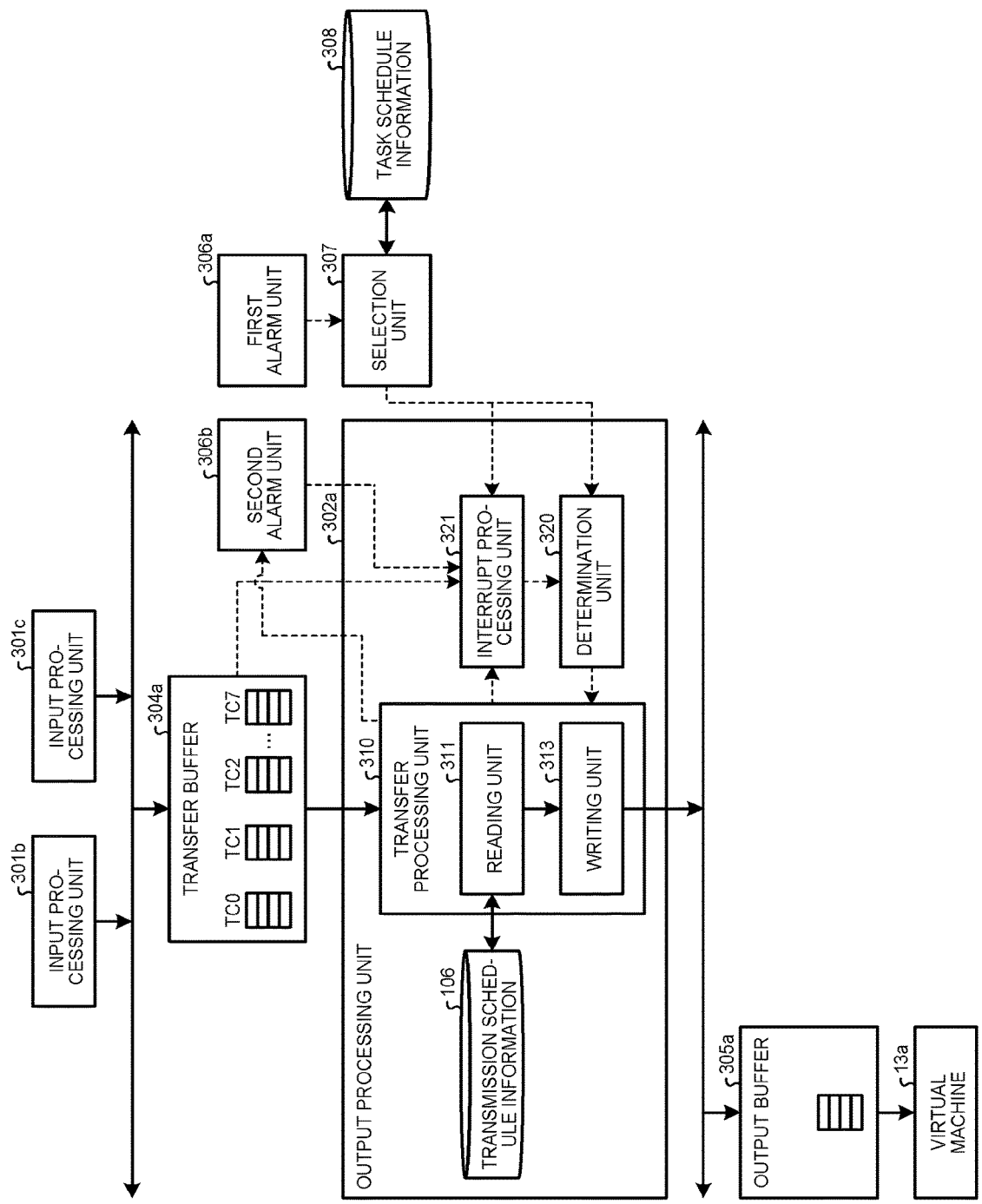
FIG. 22 is a diagram for illustrating an example of a functional configuration of an output processing unit according to the third embodiment.

FIG. 22 is a diagram for illustrating an example of a functional configuration of the output processing unit 302a according to the second embodiment. The output processing unit 302a according to the third embodiment includes the transmission schedule information 106, the transfer processing unit 310, the determination unit 320, and the interrupt processing unit 321. The transfer processing unit 310 includes the reading unit 311 and the writing unit 313.

In the third embodiment, a second alarm unit 306b notifies the interrupt processing unit 321 of an alarm. An operation of a first alarm unit 306a is identical to one of the alarm unit 306 according to the second embodiment.

Since no transmittable data (frame) exists as in the second embodiment, when an interrupt is enabled to end a task, a transmission frame is not newly input, but a state of the transmission schedule information 106 (for example, GCL) may change. In this case, although a transmittable frame exists, tasks (the input processing unit 301 and the output processing unit 302) do not operate.

Figure 23:
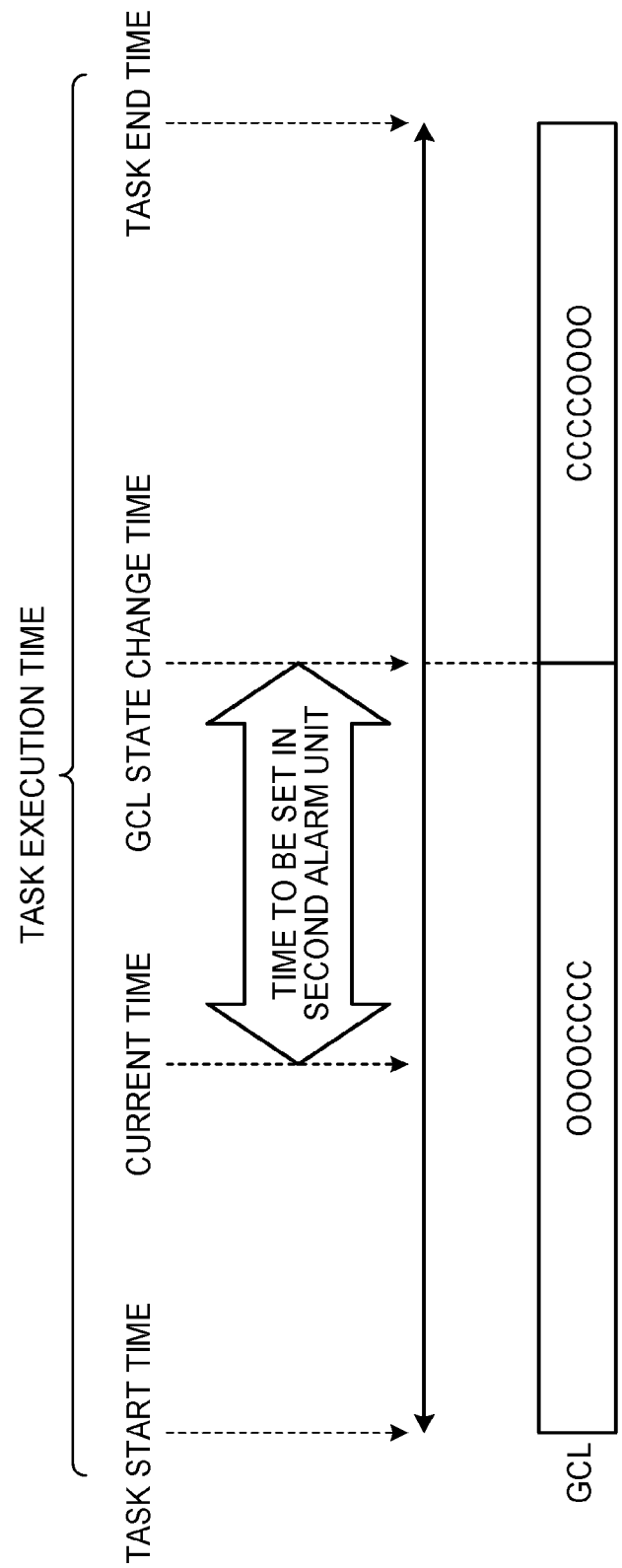
FIG. 23 is a diagram for illustrating time set in a second alarm unit according to the third embodiment.

Thus, in the third embodiment, as illustrated in FIG. 23, the transfer processing unit 310 sets, when enabling an interrupt to end a task, time before a next change in the GCL in the second alarm unit 306b. In FIG. 23, O indicates Open, and C indicates Close.

The second alarm unit 306b gives notice of an alarm after time set as in FIG. 23 has elapsed. In other words, when first data that can be transferred by a first task selected by the selection unit 307 does not exist in a buffer and a state of a gate control list changes by an end time, the second alarm unit 306b notifies the interrupt processing unit 321 at a time when the state of the gate control list changes. When receiving the notice from the second alarm unit 306b, the interrupt processing unit 321 notifies the determination unit 320. Then, the determination unit 320 determines, when notified by the interrupt processing unit 321, whether transfer processing of the first data is executable by a first task to which an interrupt has been enabled.

As a result, data (frame) exists in a buffer but a frame that has been unable to be transmitted due to a state of the GCL can be transmitted after the state of the GCL changes.

If a change time of the GCL is later than a task end time, the transfer processing unit 310 does not set a time in the second alarm unit 306b (the second alarm unit 306b is not operated). In this case, an operation according to the third embodiment is identical to one according to the second embodiment.

Figure 24:
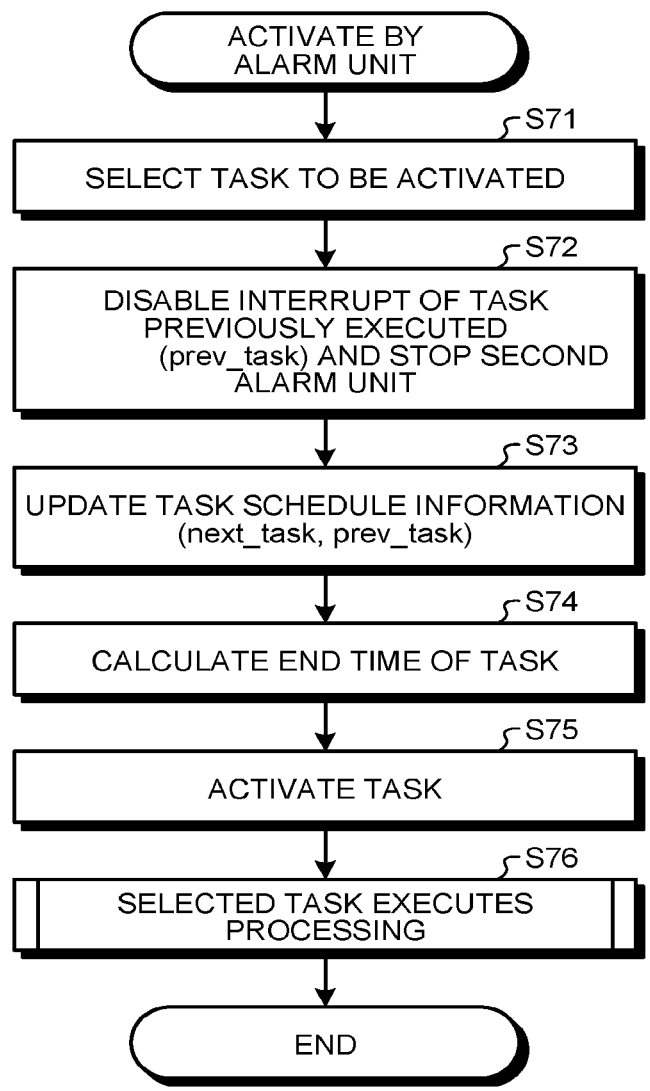
FIG. 24 is a flowchart for illustrating an example of activation processing of a task according to the third embodiment.

FIG. 24 is a flowchart for illustrating an example of activation processing of a task according to the third embodiment. First, the selection unit 307 refers to the task schedule information 308 and selects a task to be activated (Step S71). Next, the selection unit 307 disables an interrupt of a task previously executed (prev_task) and stops the second alarm unit 306b (Step S72).

Descriptions of Steps S73 to S76 are similar to those of Steps S33 to S36 in the second embodiment and thus will be omitted.

Figure 25:
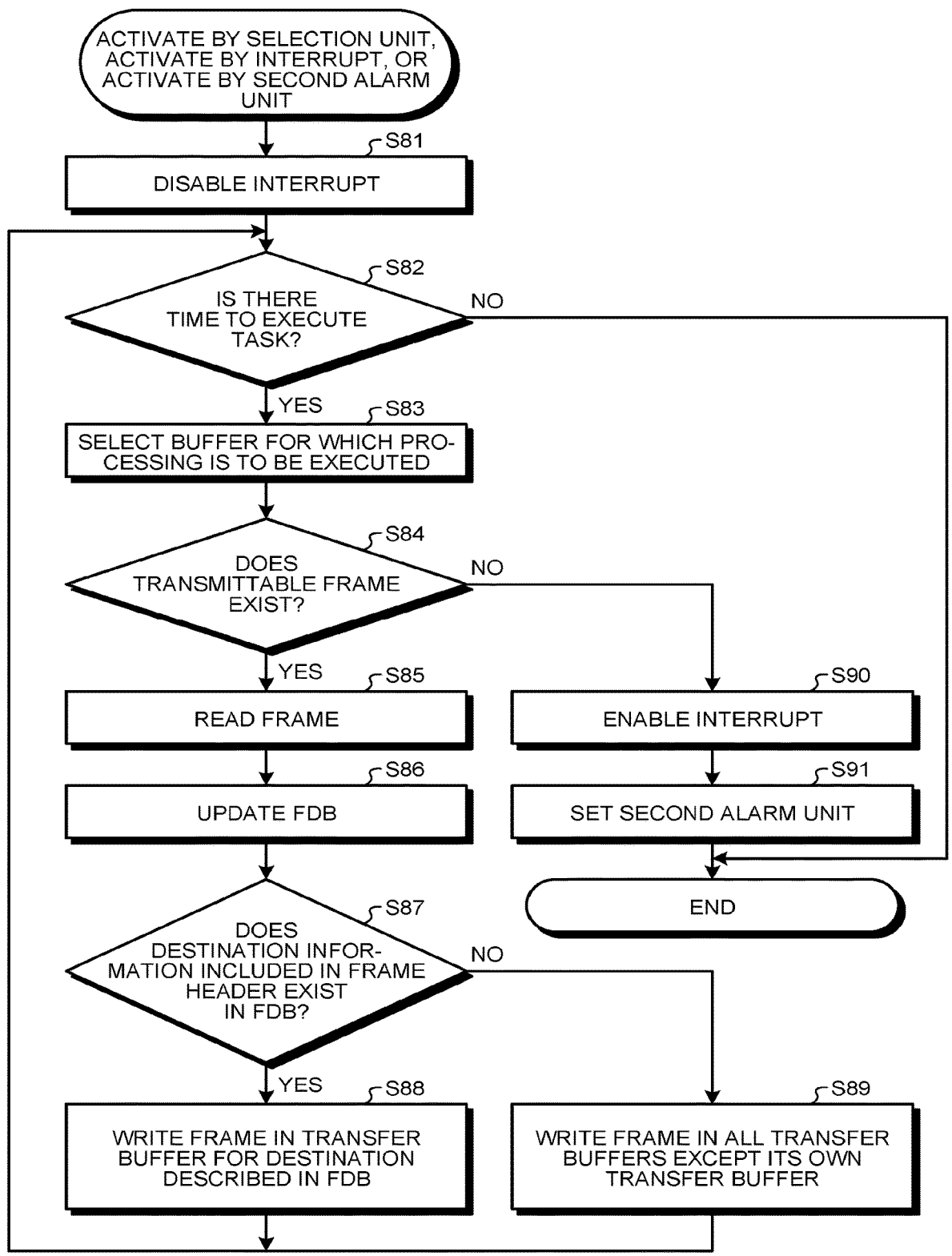
FIG. 25 is a flowchart for illustrating an example of data input processing according to the third embodiment.

FIG. 25 is a flowchart for illustrating an example of data input processing according to the third embodiment. Descriptions of Steps S81 to S90 are similar to those of Steps S41 to S50 in the second embodiment and thus will be omitted.

The transfer processing unit 310 sets time before a next change in the transmission schedule information 106 (for example, GCL) (see FIG. 23) in the second alarm unit 306b (Step S91).

Figure 26:
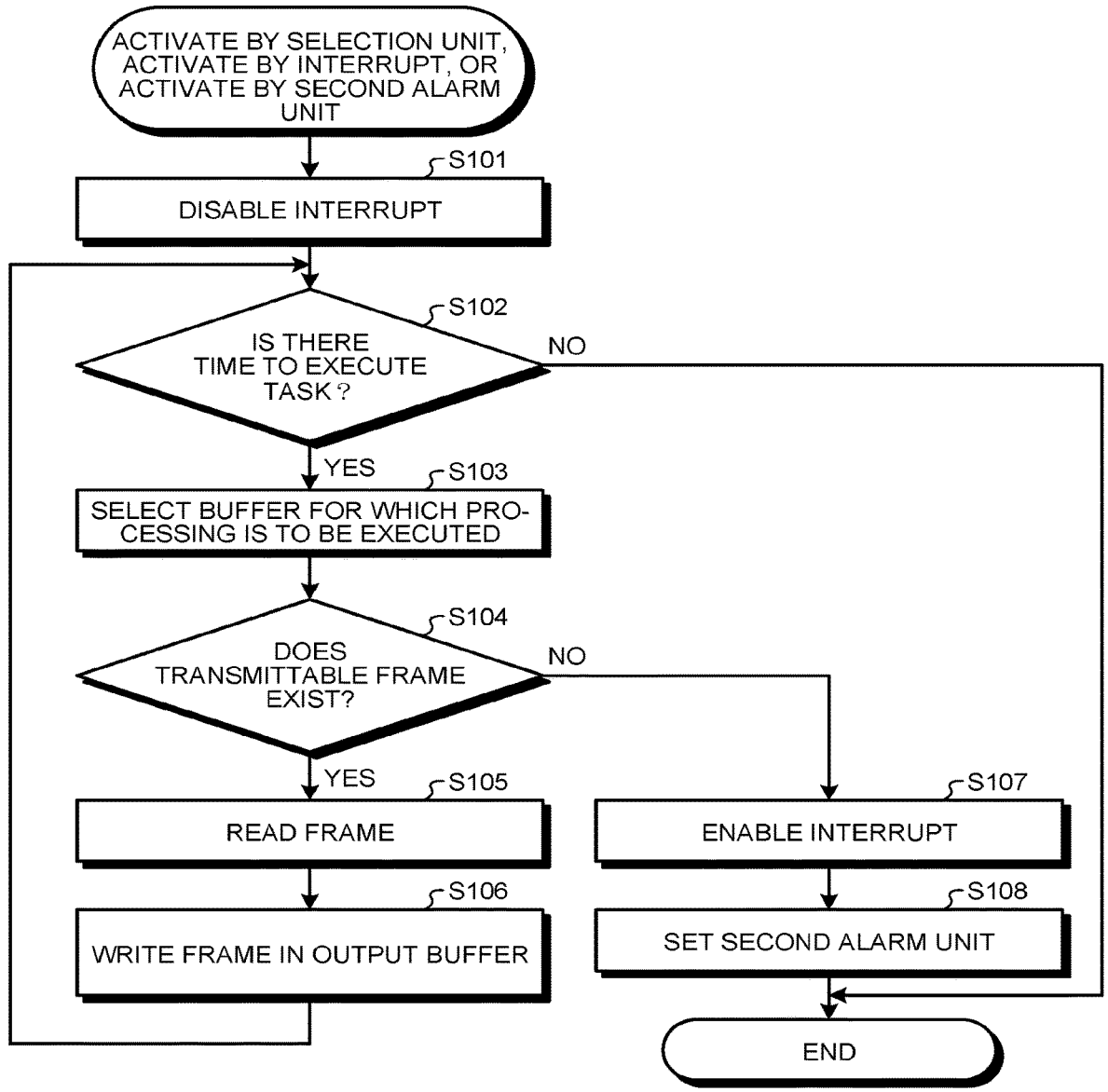
FIG. 26 is a flowchart for illustrating an example of data output processing according to the third embodiment.

FIG. 26 is a flowchart for illustrating an example of data output processing according to the third embodiment. Descriptions of Steps S101 to S107 are similar to those of Steps S61 to S67 in the second embodiment and thus will be omitted.

The transfer processing unit 310 sets time before a next change in the transmission schedule information 106 (for example, GCL) (see FIG. 23) in the second alarm unit 306b (Step S108).

Effects of Third Embodiment

As described above, with the switch device 100-3 according to the third embodiment, data (frame) exists in a buffer but a frame that has been unable to be transmitted due to a state of the GCL can be transmitted after the state of the GCL changes.

Fourth Embodiment

Next, a fourth embodiment will be described. In description of the fourth embodiment, descriptions similar to those of the first embodiment will be omitted. In the fourth embodiment, a case where a task is executed with multi-core will be described.

Figure 27:
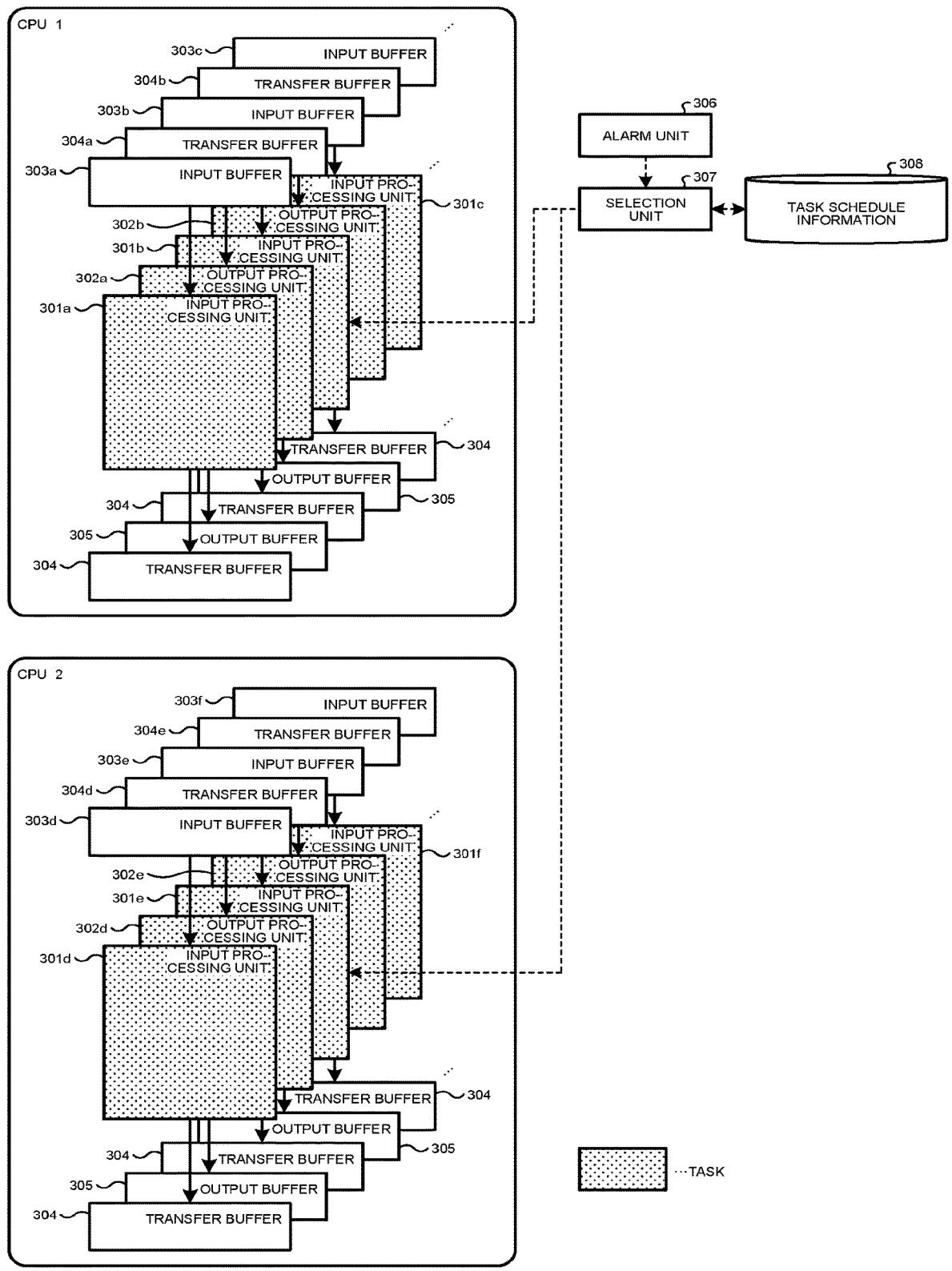
FIG. 27 is a diagram for illustrating an example of controlling a task according to a fourth embodiment.

FIG. 27 is a diagram for illustrating an example of controlling a task according to the fourth embodiment. In the example in FIG. 27, a CPU that executes the task is designated for each task. For example, the input processing unit 301a is executed on a CPU 1 but not executed on a CPU 2. On the other hand, for example, an input processing unit 301d is executed on the CPU 2 but not executed on the CPU 1.

Figure 28:
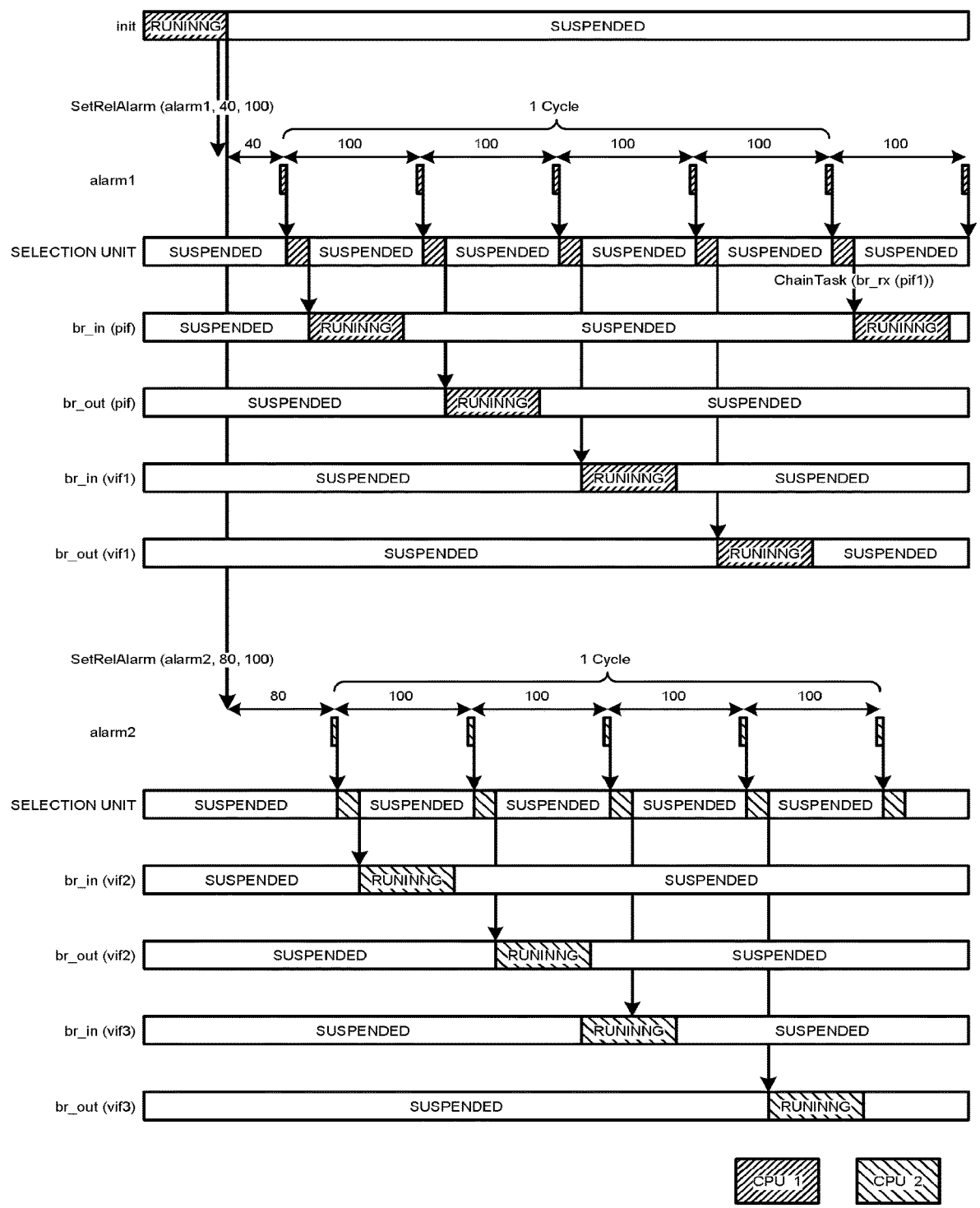
FIG. 28 is a diagram for illustrating an image of executing the task according to the fourth embodiment.

As illustrated in FIG. 27, designating a CPU that executes the task for each task makes it possible to execute a plurality of tasks in synchronization with the transmission schedule information 106 of data (frame) as illustrated in FIG. 28.

FIG. 28 is a diagram for illustrating an image of executing the task according to the fourth embodiment. In the CPU 1, the selection unit 307 selects and activates each task in a cycle of alarm 1. In the CPU 2, the selection unit 307 selects and activates each task in a cycle of alarm 2.

On the other hand, when a plurality of tasks (the input processing unit 301) is simultaneously executed, conflicts occur when writing in the transfer buffer 304. In order to avoid access conflicts, locks are generally used, but for tasks requiring real-time processing, time to lock is delay time hard to simulate.

Another method without using locks is to divide a buffer into the number of tasks that are simultaneously executed (separate a buffer to be accessed for each CPU). However, this method makes it difficult for the output processing unit 302 that reads a frame from a buffer to recognize into which buffer a frame is input first. In a normal switch device, there is no problem if a frame is read from a buffer by a method such as round robin. However, in real-time communication in which a frame is transmitted at timing scheduled in advance, changes in frame order lead to a problem.

Figure 29:
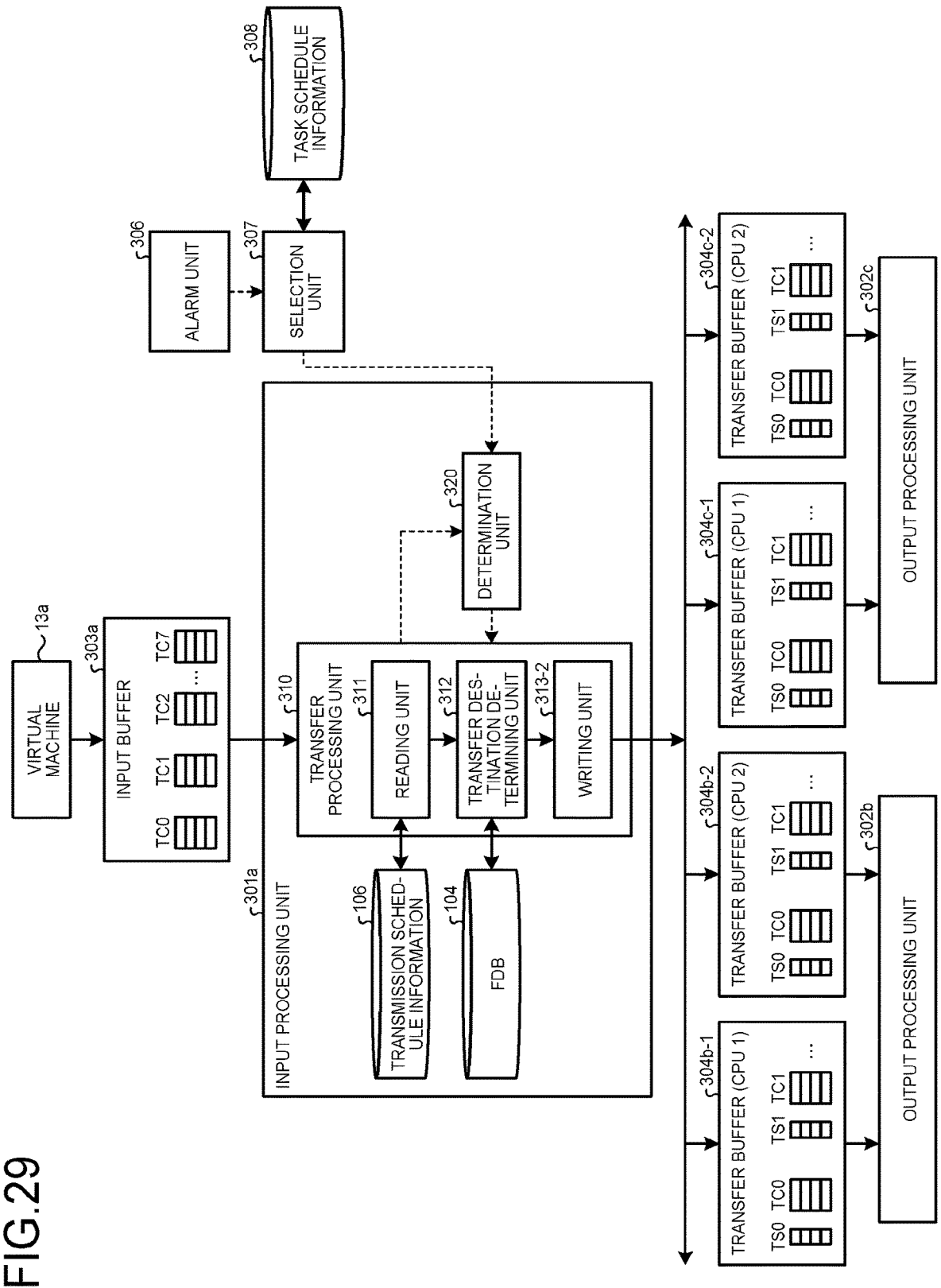
FIG. 29 is a diagram for illustrating an example of a functional configuration of an input processing unit according to the fourth embodiment.
Figure 30:
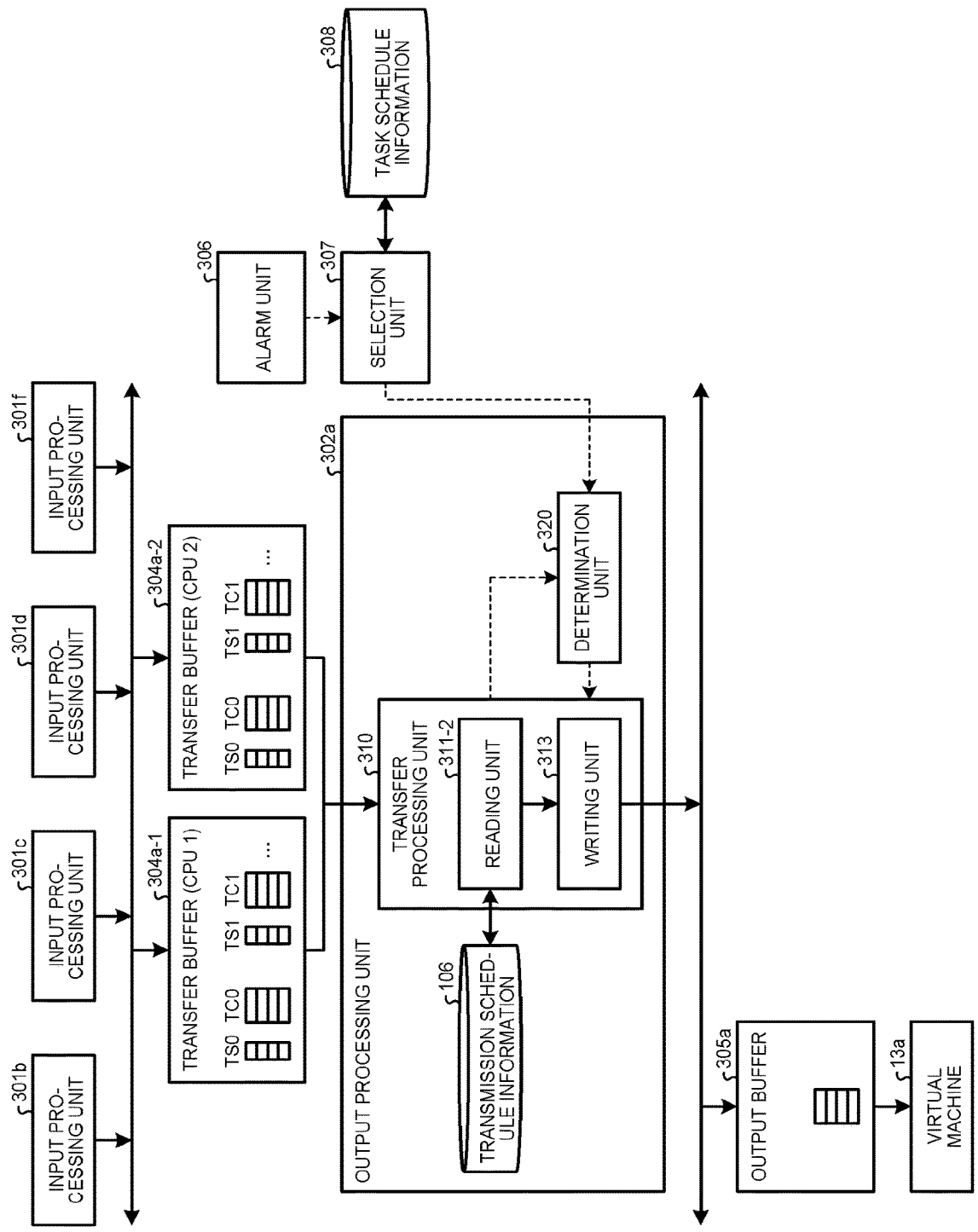
FIG. 30 is a diagram for illustrating an example of a functional configuration of an output processing unit according to the fourth embodiment.

Thus, in the fourth embodiment, as illustrated in FIGS. 29 and 30, the transfer buffer 304 separated for each CPU is prepared, and an area to hold a time stamp (TS) is secured in a queue in each traffic class of the transfer buffer 304.

FIG. 29 is a diagram for illustrating an example of a functional configuration of the input processing unit 301a according to the fourth embodiment. The input processing unit 301a according to the fourth embodiment includes the FDB 104, the transmission schedule information 106, the transfer processing unit 310, and the determination unit 320. The transfer processing unit 310 includes the reading unit 311, the transfer destination determining unit 312, and a writing unit 313-2.

In the fourth embodiment, the writing unit 313-2 is different from the writing unit 313 according to the first embodiment. The writing unit 313-2 selects, when writing data (frame) in the transfer buffer 304, a buffer on a side of a CPU executing its own task and writes a current time (time stamp) together with a frame.

For example, the input processing unit 301a that operates on the CPU 1 writes, when transferring a frame to the virtual machine 13b, the data in the transfer buffer 304b-1.

FIG. 30 is a diagram for illustrating an example of a functional configuration of the output processing unit 302a according to the fourth embodiment. The output processing unit 302a according to the fourth embodiment includes the transmission schedule information 106, the transfer processing unit 310, and the determination unit 320. The transfer processing unit 310 includes a reading unit 311-2 and the writing unit 313.

In the fourth embodiment, the reading unit 311-2 is different from the reading unit 311 according to the first embodiment. The reading unit 311-2 compares time stamps when reading data (frame) and reads a frame from a buffer with earlier written time.

Effects of Fourth Embodiment

With the configurations in FIGS. 29 and 30 described above, the fourth embodiment makes it possible to process a frame in an order designated by the transmission schedule information 106 of data (frame) while eliminating a delay hard to estimate.

In the above description, for the sake of simplicity, a case of two cores (CPUs 1 and 2) has been described, but the number of cores may be arbitrary.

In other words, it is only necessary that a processor that executes the first task be allocated for each first task, and a buffer that holds first data to be transferred be allocated for each combination of a processor and a transfer destination. In this case, a first task of receiving input of first data and transferring the first data writes, in a buffer allocated to a processor on which the first task of receiving the input of the first data and transferring the first data is executed, the first data and writing time (time stamp) of the first data. The first task of outputting the transferred first data to a transfer destination reads, from a buffer allocated for each combination of a processor and a transfer destination, the first data in order of writing time.

Finally, an example of a hardware configuration of the switch device 100-3 according to the first to the fourth embodiments will be described.

Example of Hardware Configuration

Figure 31:
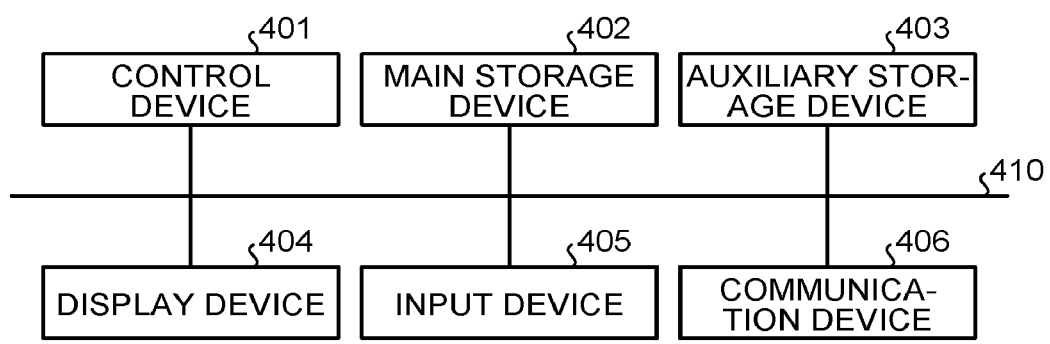
FIG. 31 is a diagram for illustrating an example of a hardware configuration of the switch device according to the first to the fourth embodiments.

FIG. 31 is a diagram for illustrating an example of the hardware configuration of the switch device 100-3 according to the first to the fourth embodiments. The switch device 100-3 according to the first to the fourth embodiments includes a control device 401, a main storage device 402, an auxiliary storage device 403, a display device 404, an input device 405, and a communication device 406. The control device 401, the main storage device 402, the auxiliary storage device 403, the display device 404, the input device 405, and the communication device 406 are connected via a bus 410.

The control device 401 executes a program read from the auxiliary storage device 403 to the main storage device 402. The main storage device 402 is a memory such as a read only memory (ROM) and a random access memory (RAM). The auxiliary storage device 403 is a hard disk drive (HDD), a memory card, or the like.

The display device 404 is a device that displays, for example, a state of the switch device 100-3. The display device 404 is, for example, a liquid crystal display.

The input device 405 is a device that operates the switch device 100-3. The input device 405 is, for example, a keyboard and a mouse.

The communication device 406 is a device that communicates with an external device, for example.

A program executed by the switch device 100-3 according to the first to the fourth embodiments is recorded in a file in installable format or executable format in a computer readable storage medium such as a CD-ROM, a memory card, a CD-R, and a DVD and provided as a computer program product.

Also, a program executed by the switch device 100-3 according to the first to the fourth embodiments may be configured to be stored on a computer connected to a network such as the Internet and provided by being downloaded via a network.

In addition, a program executed by the switch device 100-3 according to the first to the fourth embodiments may be configured to be provided via a network such as the Internet without being downloaded.

Further, a program of the switch device 100-3 according to the first to the fourth embodiments may be configured to be provided by being incorporated in advance in a ROM, for example.

A program executed by the switch device 100-3 according to the first to the fourth embodiments has a module configuration including a functional block that can also be realized by a program among functional blocks of the switch device 100-3 according to the first to the fourth embodiments. As actual hardware, each of the functional blocks is loaded on the main storage device 402 by a program read from a storage medium and executed by the control device 401. In other words, each of the functional blocks is generated on the main storage device 402.

Part or all of the functional blocks may be realized by hardware such as an IC without being realized by software.

When each function is realized by using a plurality of processors, each processor may realize one of the functions or may realize two or more of the functions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A switch device comprising:
a memory; and
one or more hardware processors coupled to the memory and configured to function as:
a selection unit that, based on task schedule information synchronized with transmission schedule information where transmission timing of first data is determined for each priority of the first data, selects a first task of executing transfer processing of the first data and calculates an end time of transfer processing executed by the selected first task; and
a determination unit that, from the end time and a current time, determines whether transfer processing of the first data is executable, wherein
the first task selected by the selection unit, when the transfer processing is executable, executes the transfer processing of the first data based on the transmission schedule information.

2. The device according to claim 1, wherein the transmission schedule information and the task schedule information are synchronized by matching a start time of selection control of the first task with a start time of transmission timing control based on the transmission schedule information.

3. The device according to claim 1, further comprising an interrupt processing unit that notifies, upon detecting input of the first data into a buffer referred to by the first task, the determination unit when an interrupt to the first task is enabled, wherein
the selection unit, when selecting the first task, disables an interrupt to the first task to be selected,
the first task selected by the selection unit, when the first data that is able to be transferred does not exist in the buffer during transfer processing, enables an interrupt and suspends transfer processing, and the determination unit, when notified by the interrupt processing unit, determines whether transfer processing of the first data is executable by the first task to which the interrupt has been enabled.

4. The device according to claim 3, wherein the selection unit, when transfer processing of the first task is suspended, selects a second task of executing transfer processing of second data, and the second task selected by the selection unit executes transfer processing of the second data until the first task to which the interrupt has been enabled or a new first task is selected by the selection unit.

5. The device according to claim 4, wherein the first task is a non-preemptive task, and the second task is a preemptive task.

6. The device according to claim 5, wherein the transmission schedule information is a gate control list of IEEE 802.1 Qbv.

7. The device according to claim 6, further comprising an alarm unit that, when the first data that is able to be transferred by the first task selected by the selection unit does not exist in the buffer and a state of the gate control list changes by the end time, notifies the interrupt processing unit at a time when a state of the gate control list changes, wherein the interrupt processing unit, when notified by the alarm unit, notifies the determination unit, and the determination unit determines, when notified by the interrupt processing unit, whether transfer processing of the first data is executable by the first task to which an interrupt has been enabled.

8. The device according to claim 1, wherein a processor is allocated for each first task, the processor executing the first task, a buffer that holds the first data to be transferred is allocated for each combination of the processor and a transfer destination, a first task of receiving input of the first data and transferring the first data writes the first data and writing time of the first data in a buffer allocated to a processor on which the first task of receiving the input of the first data and transferring the first data is executed, and a first task of outputting the transferred first data to a transfer destination reads the first data in order of writing time, from a buffer allocated for each combination of the processor and the transfer destination.

9. A switching method comprising:

selecting, by a selection unit, based on task schedule information synchronized with transmission schedule information where transmission timing of first data is determined for each priority of the first data, a first task of executing transfer processing of the first data and calculating an end time of transfer processing executed by the selected first task;

determining, by a determination unit, from the end time and a current time, whether transfer processing of the first data is executable; and executing, by the first task selected by the selection unit, when transfer processing is executable, transfer processing of the first data based on the transmission schedule information.

10. A computer program product comprising a non-transitory computer-readable medium including programmed instructions, the instructions causing a computer to function as:

a selection unit that, based on task schedule information synchronized with transmission schedule information where transmission timing of first data is determined for each priority of the first data, selects a first task of executing transfer processing of the first data and calculates an end time of transfer processing executed by the selected first task, and a determination unit that, from the end time and a current time, determines whether transfer processing of the first data is executable, wherein the first task selected by the selection unit, when the transfer processing is executable, executes transfer processing of the first data based on the transmission schedule information.

* * * * *